United States Patent [19]

Nishimoto et al.

[11] Patent Number: 5,374,799
[45] Date of Patent: Dec. 20, 1994

[54] METHOD FOR THE ASSEMBLY OF AUTOMOTIVE VEHICLE BODIES AND A JIG UNIT THEREFOR

[75] Inventors: Shuji Nishimoto; Masahiro Osumi, both of Hiroshima, Japan

[73] Assignee: Mazda Motor Corporation, Hiroshima, Japan

[21] Appl. No.: 827,434

[22] Filed: Jan. 29, 1992

[30] Foreign Application Priority Data

| Jan. 30, 1991 | [JP] | Japan | 3-031935 |
| Jan. 30, 1991 | [JP] | Japan | 3-031937 |
| Jan. 30, 1991 | [JP] | Japan | 3-031939 |
| Jan. 30, 1991 | [JP] | Japan | 3-031940 |

[51] Int. Cl.⁵ ............................. B23K 37/04
[52] U.S. Cl. .................. 219/117.1; 219/80; 228/6.1
[58] Field of Search .............. 901/42; 29/467, 468, 29/430, 33 K, 784, 793, 794, 795; 228/DIG. 1, 4.1, 6.1, 49.1; 219/79, 80, 86.24, 86.7, 117.1, 158, 161

[56] References Cited

U.S. PATENT DOCUMENTS

| 3,288,978 | 11/1966 | Trygar | 219/80 |
| 4,404,451 | 9/1983 | Niikawa et al. | 219/80 |
| 4,442,335 | 4/1984 | Rossi | 219/79 |
| 4,535,927 | 8/1985 | Matsubara et al. | 228/6.1 |
| 4,538,044 | 8/1985 | Kadowaki et al. | 219/80 |
| 4,667,866 | 5/1987 | Tobita et al. | 228/4.1 |
| 4,759,489 | 7/1988 | Pigott | 29/430 |
| 4,767,046 | 8/1988 | Kumagai et al. | 228/4.1 |
| 4,795,075 | 1/1989 | Pigott et al. | 219/80 |
| 5,123,161 | 6/1992 | Kubo et al. | 29/784 |
| 5,165,164 | 11/1992 | Kubo et al. | 228/6.1 |

FOREIGN PATENT DOCUMENTS

| 64-1667 | 1/1989 | Japan . |
| 64-11077 | 1/1989 | Japan | 219/86.25 |

*Primary Examiner*—Geoffrey S. Evans
*Attorney, Agent, or Firm*—Fish & Richardson

[57] ABSTRACT

In a vehicle body assembly line is disposed a jig unit having a mechanism for aligning and clamping a side inner panel and a mechanism for aligning and clamping a front header and a rear header of a roof panel. Each of the mechanisms is movable between a position of aligning and holding the member for structuring a vehicle body and a position of evacuating the mechanism from the vehicle body sections. The vehicle body assembly line has nine stations for subassembling the structuring members. In the second station, the side inner panel is set to the jig unit which is transferred to the third station with a welding robot disposed therein, in which the front and rear headers are set to the jig unit and they are temporarily welded to the side inner panel. The jig unit is transferred to the fourth station where the headers are permanently welded to the side inner panel. The side outer panel is aligned on the basis of the side inner panel in the fifth station and it is welded in the sixth station. In the ninth station, the jig unit is evacuated from the vehicle body section from below.

36 Claims, 34 Drawing Sheets

METHOD FOR THE ASSEMBLY OF AUTOMOTIVE VEHICLE BODIES AND A JIG UNIT THEREFOR

BACKGROUND OF THE INVENTION

1. Field of the Invention

The present invention relates to a method for the assembly of automotive vehicle bodies and a jig unit to be employed therefor.

2. Description of the Related Art

In assembling automotive vehicle bodies in a vehicle body assembly line, each of main floor panels, front vehicle bodies, rear vehicle bodies containing rear floor members, vehicle body side panels (consisting of side inner panels and side outer panels), roof panels (consisting of roof inner members and roof outer panels) and lid members such as side doors, bonnets and trunk lids are usually sub-assembled in corresponding subassembly lines, and they are supplied from the corresponding sub-assembly lines to the vehicle body assembly line. Further, in a stage of the vehicle body assembly line for assembling an under vehicle body section, a floor panel, a front vehicle body section and a rear vehicle body section are aligned and fixed to a carriage or carrier with plural aligning members and clamping units mounted thereto and the under vehicle body section is assembled by welding temporarily and thereafter by welding supplementarily or permanently.

The under vehicle body section loaded on the carriage or carrier is transferred to the stage for mounting the upper vehicle body sections, and the vehicle body side panels, the roof panel, etc. are mounted to the under vehicle body section. In mounting the vehicle body side panel, the roof panel, etc. to the under vehicle body section, they are aligned with the under vehicle body section on the basis of the reference surfaces of their outer panels with the aid of an exclusive aligning unit disposed in each of stations, they are fixed to the carriage or carrier, and they are welded temporarily and thereafter supplementarily or permanently. The under vehicle body section is then mounted to the upper vehicle body section. Front fenders and rear fenders are mounted to the vehicle body section in a stage for mounting the upper vehicle body section.

On the other hand, Japanese Patent Laid-open Publication (kokai) No. 64-1,667 discloses a holding unit for holding a partially mounted vehicle body section. The holding unit comprises a main frame and three pairs of inner upstanding frames. The main frame is supported horizontally by four column members disposed upstanding on the floor of a factory and further mounted to the two upstanding columns disposed on a single side so as to be movable vertically. The three pairs of the inner frames are mounted to the main frame in the positions corresponding to the position in the vicinity of a vehicle body cowl section, the central vehicle body portion and the rear vehicle body portion, respectively, so as to be openably movable in the transverse direction of the vehicle body. To each of the inner frames are mounted plural clamping units, tools and so on. The three pairs of the inner frames are inserted from top into the roof opening of the partially mounted vehicle body shell (looking like the left-hand and right-hand side inner panels being temporarily mounted to the under vehicle body section) by swinging a lower end portion of the main frame of the holding unit. Thereafter, the three pairs of the inner frames are expanded to approach an inner surface of the vehicle body shell, and the rest of the assembly operations is carried out with the aid of plural clamps, tools and so on.

Conventional methods for the assembly of automotive vehicle bodies suffer from various disadvantages because the panel members, such as vehicle body side panels, etc. are aligned on the basis of their outer panels with the aid of an exclusive aligning jig. The outer panels are so curved and complex in outer shape, the error in shape becomes so large due to the influence of the return of the curvature of the outer panels to their original shape, and rigidity of the outer panels is so low that accuracy in alignment of the outer panel members is likely to become low. Further, the outer panel members vary in shape in accordance with models so that the exclusive aligning tools should be prepared for each of the models of automotive vehicles. In addition, the aligning jigs of plural kinds should be made ready for immediate use in each station and the aligning jigs should be fastened to and detached from the vehicle body section plural times during mounting so that working efficiency may become low. On the other hand, as the main floor panel is mounted to the upper vehicle body section in an initial stage of the conventional vehicle body assembly line, a large-sized and multi-functional mounting jig unit for mounting the vehicle body sections cannot be disposed within the mounting vehicle body section and operations for mounting various parts, units and accessories, such as seats, may become very difficult. Further, problems arise that inner members should be provided with a number of welding holes for welding the connections of the side inner panels, such as sub-assembled vehicle body side panels, and the roof inner panels, that efficiency in operation for welding the inner members may become low, as well as that the number of stations for operations for welding and connecting become greater and that the length of the stations become longer, because welding robots and so on are disposed outside the vehicle body sections which are being mounted and, as a result, because the vehicle body sections are subjected to welding only from outside.

In the vehicle body section assembly line using the holding unit as disclosed in Japanese Patent Laid-open Publication (kokai) No. 64-1,667, the holding unit is applied to at least the under vehicle body section which is temporarily mounted to the side inner panel. Hence, the step is required for temporarily mounting the under vehicle body sections to the side inner panels. In addition, brackets, stays, bolts and so on are required for temporarily mounting the under vehicle body sections to the side inner panels, so that the structures of the panel members may become complex. Further, the three inner frames of the holding unit are inserted into the vehicle body shell through a comparably small roof opening section thereof, so that an inner frame thereof cannot be made larger in size and multiple in function, thereby rendering operations laborious and less efficient.

SUMMARY OF THE INVENTION

The object of the present invention is to provide a method for the assembly of automotive vehicle bodies and a jig unit to be employed therefor, which can improve accuracy in aligning the automotive vehicle bodies in mounting at least the vehicle body side panels to the roof panels, which can simplify the structure of members for structuring the automotive vehicle bodies, which are superior in general applicability to multiple models of the automotive vehicle bodies, which can improve the efficiency in mounting operations, and which can improve the efficiency in mounting parts, units and accessories to the main floor panels.

In order to achieve the aforesaid object, the present invention consists of a method for the assembly of an automotive vehicle body, comprising:

a first step for setting a vehicle body side panel and a roof panel to a jig unit having a first holding mechanism for holding the vehicle body side panel after the vehicle body side panel has been aligned with the jig unit on the basis of an inner panel of the vehicle body side panel and a second holding mechanism for holding the roof panel after the roof panel has been aligned with the jig unit on the basis of an inner panel of the roof panel;

a second step for connecting the vehicle body side panel, set to the jig unit, to the roof panel to form a vehicle body assembly; and a third step for evacuating the jig unit relatively downward from the vehicle body assembly.

The method for the assembly of the automotive vehicle can present the following advantages because both of the left-hand and right-hand vehicle body side panels and the roof panel are aligned on the basis of the side inner panels as well as the front header and the rear header constituting the roof inner members of the roof panel. These inner members are more accurate in shape than their outer panels, so that the vehicle body side panels and the roof panel can be mounted through the corresponding inner members with high accuracy. Further, as neither brackets nor stays nor bolts are required to be mounted in temporarily mounting these panel members, the structure of the panel members can be made less complex and the step for temporarily mounting the vehicle body section can be omitted. In addition, this method is superior in generalization and in economy because a common jig unit can be applied to the panel members of different and various models of automotive vehicles due to the relative similarity of the side inner panels and the roof inner members in shape and structure to each other, even if the models of the automotive vehicles vary, and due to the comparably large number of opening portions capable of being held by the holding mechanism. Furthermore, as the jig unit can be arranged to be evacuated in the third step from the vehicle body assembly produced by assembling the vehicle body side panels with the roof panels, the jig unit can be made larger in size and multiple in function so that the mounting operations can be made highly efficient.

An another aspect of the present invention consists of the method for the assembly of the automotive vehicle body in a vehicle body assembly line for mounting at least left-hand and right-hand vehicle body side panels to a roof panel, in which a side inner panel of each of the left-hand and right-hand vehicle body side panels is sub-assembled with a side outer panel thereof to form a side panel sub-assembly, a roof inner member of a roof panel is sub-assembled with a roof outer panel thereof to form a roof panel subassembly, the side panel sub-assembly and the roof panel sub-assembly are supplied separately to a connecting station which the side panel sub-assembly is in connected to the roof panel sub-assembly, and the side panel-sub-assembly is connected to the roof panel subassembly in the connecting station, which comprises:

a first step for connecting the left-hand and right-hand vehicle body side inner panels to the roof panel by aligning the left-hand and right-hand vehicle body side inner panels and the roof panel supplied to the connecting station, fixing the left-hand and right-hand vehicle body side inner panels and the roof panel aligned, welding the left-hand and right-hand vehicle body side inner panels to the roof panel temporarily and thereafter supplementarily or permanently; and a second step for connecting the left-hand and right-hand vehicle body side outer panels to the roof panel by supplying the left-hand and right-hand side outer panels and the roof outer panel to the connecting station, aligning the left-hand and right-hand vehicle body side outer panels with the respective side inner panels, aligning the roof outer panel with the roof inner member, and welding the left-hand and right-hand vehicle body side outer panels to the roof panel temporarily and then supplementarily or permanently.

In accordance with the another aspect of the present invention, the left-hand and right-hand side inner panels are connected to the roof inner members in the first step by aligning, fixing and welding them temporarily and then supplementarily or permanently. The accurate aligning can be implemented on the basis of the side inner panel or the roof inner member, which is the member that is relatively simple in shape, high in rigidity and less in error of shape due to the return to its original shape from its curved shape. Further, the welding operations can be implemented with high efficiency in such a state that no alignment is implemented on the basis of the outer panel unlike in conventional procedures. In addition, as no welding holes are needed to be provided for the side inner panels and the roof inner member, and neither brackets nor stays nor bolts are required to be mounted to the side inner panels and the roof inner member for temporarily mounting, the structure of the side inner panels and the roof inner members can be simplified.

Further, in the second step, the left-hand and right-hand side outer panels are connected to the roof outer panel by aligning the left-hand and right-hand with the respective side inner panels, on the one hand, and the roof outer panel with the roof inner member, on the other hand, and welding them temporarily and then supplementarily or permanently, so that the outer panels can accurately be aligned with the side inner panels and the roof inner members which have been aligned and can be connected with high accuracy. Hence, the vehicle bodies can be assembled with high accuracy.

In a preferred mode of the present invention, the left-hand and right-hand side outer panels are welded supplementarily or permanently to the roof outer panel in the second step by the welding means disposed within and outside the vehicle body section in the second step, so that the welding operations can be carried out with improved efficiency and the number of stations for supplementarily or permanently welding can be reduced, thereby shortening the vehicle body assembly line.

In a more preferred mode of the present invention, the left-hand and right-hand side outer panels are welded to the roof outer panel temporarily with the aid of the welding means disposed within the vehicle body section in the second step and then supplementarily or permanently with a welding robot disposed outside the vehicle body section in a station where the supplementary or permanent welding is to be implemented. This arrangement for the welding operations can improve the efficiency in the temporarily welding operations and the generalization in the assembly of the vehicle bodies of various models and kinds. Further, as the supplementarily or permanently welding operations are carried out with the welding robot disposed outside the vehicle body section, the generalization can be enhanced in assembling the vehicle bodies of various models and kinds.

On the other hand, a jig unit according to the present invention for assembling the automotive vehicle bodies, is characterized by:

a first holding mechanism disposed inside vehicle body side panels for holding the vehicle body side panels aligned on the basis of side inner panels of the respective side panels; and a second holding mechanism disposed inside a roof panel for holding the roof panel aligned on the basis of a roof inner member of the roof panel;

wherein the first holding mechanism is so arranged as to be movable between a first position in which the side panels are held and a second position in which the first holding mechanism is evacuated from the side panels; and wherein the second holding mechanism is so arranged as to be movable between a first position in which the roof panel is held and a second position in which the second holding mechanism is evacuated from the roof panel.

In accordance with the present invention relating to the Jig unit as described hereinabove, the jig unit can align the left-hand and right-hand vehicle body side panels on the basis of their respective side inner panels which are comparably simple in shape, high in rigidity and small in error of shape due to the return to its original shape from its curved shape, and it can fix them to the jig unit. Likewise, the jig unit can align the roof panel on the basis of its roof inner member which is comparably simple in shape, high in rigidity and small in error of shape due to the return to its original shape from its curved shape, and it can fix the roof panel to the jig unit. This arrangement can allow left-hand and right-hand vehicle body side panels and the roof panel to be aligned with and fixed to the roof panel with high accuracy.

Further, as the left-hand and right-hand vehicle body side panels as well as the roof panel are supplied to the jig unit and they are then mounted thereto, neither brackets nor stays nor bolts are required for temporarily mounting these panel members so that the structure of the panel members can be made simple and that the temporarily mounting step for temporarily mounting part of the vehicle body can be omitted. In addition, the jig unit according to the present invention is superior in generalization because it can be applied to the panel members for various models of automotive vehicles in substantially the same manner due to similarity of the shape and the structure and the disposition of a large number of openings to be held by the holding mechanism.

Furthermore, as the first and second holding mechanism can be moved between the first and second positions, the jig unit can be evacuated from the vehicle body section by transferring the jig unit downward relative to and from the vehicle body section after the vehicle body section has been assembled. Hence, the jig unit can be made so large in size and so multiple in function that the mounting operations can be facilitated with high efficiency.

Other objects, features and advantages of the present invention will become apparent in the course of the description of the preferred embodiments, which follows, with reference to the accompanying drawings.

BRIEF DESCRIPTION OF THE DRAWINGS

FIGS. 1 to 14 are directed to the first embodiment according to the present invention; in which:

FIG. 1 is a block diagram showing the outline of a vehicle body assembly line to which the assembly method according to the present invention is applied;

FIG. 2 is a perspective view showing a jig unit to be employed for the assembly method according to the present invention;

FIG. 3 is a plan view showing the jig unit of FIG. 2;

FIG. 4 is a side view showing the jig unit of FIG. 2;

FIG. 5 is a front view showing a central portion of the Jig unit of FIG. 2;

FIG. 6 is a schematic representation showing a holding mechanism disposed in the jig unit for holding a front end portion of a side inner panel;

FIG. 7 is an enlarged schematic representation showing the first to fourth stations in the vehicle body assembly line;

FIG. 8 is an enlarged schematic representation showing the fifth to eighth stations in the vehicle body assembly line;

FIG. 9 is a schematic representation showing mainly a transferring station;

FIG. 10 is a side view showing a conveying unit for supplying side inner panels to the second station S2 in the vehicle body assembly line;

FIG. 11 is a perspective view showing a robot for mounting side doors and a coupling apparatus for coupling the side doors, each disposed in the eighth station S8;

FIG. 12 is a front view showing the liftinglowering lowering apparatus disposed in the ninth station S9;

FIG. 13 is a front view showing the step for connecting the vehicle body section to the main floor panel; and FIG. 14 is a side view showing the step of FIG. 13.

FIGS. 17 to 21 are directed to a fourth embodiment of the present invention; in which:

FIG. 17 is a perspective view showing a jig unit;

FIG. 18 is a plan view showing the jig unit of FIG. 17;

FIG. 19 is a side view showing the jig unit of FIG. 17;

FIG. 20 is a perspective view showing a position adjusting unit for side doors disposed in the jig unit; and FIG. 21 is a schematic representation showing an essential portion of the vehicle body assembly line.

FIGS. 23 to 27 are directed to a sixth embodiment of the present invention, in which:

FIG. 23 is a perspective view showing the jig unit of the sixth embodiment;

FIG. 24 is a plan view showing the jig unit of FIG. 23;

FIG. 25 is a side view showing the jig unit of FIG. 23;

FIG. 26 is a plan view showing a central portion of the jig unit of FIG. 23; and FIG. 27 is a side view showing a welding unit disposed in the jig unit.

FIGS. 28 to 34 are directed to a seventh embodiment of the present invention; in which:

FIG. 28 is a schematic perspective representation showing an outline of the vehicle body assembly line for the assembly of the vehicle bodies.

FIG. 29 is an enlarged schematic perspective representation showing stations S1 to S3 of the vehicle body assembly line for the assembly of the vehicle bodies.

FIG. 30 is an enlarged schematic perspective representation showing stations S4 to S6 of the vehicle body assembly line;

FIG. 31 an enlarged schematic perspective representation showing stations S7 and S8 of the vehicle body assembly line;

FIG. 32 is a front view showing a lifting-lowering unit disused in the fifth station S5;

FIG. 33 is a perspective view showing a pallet disposed in the sixth station S6 and an outer welding robot disposed outage the vehicle body section; and FIG. 34 is a perspective view showing a welding robot disposed in the seventh station.

DESCRIPTION OF THE PREFERRED EMBODIMENTS

The present invention will be described more in detail with reference to the accompanying drawings.

FIRST EMBODIMENT

Figure 1:
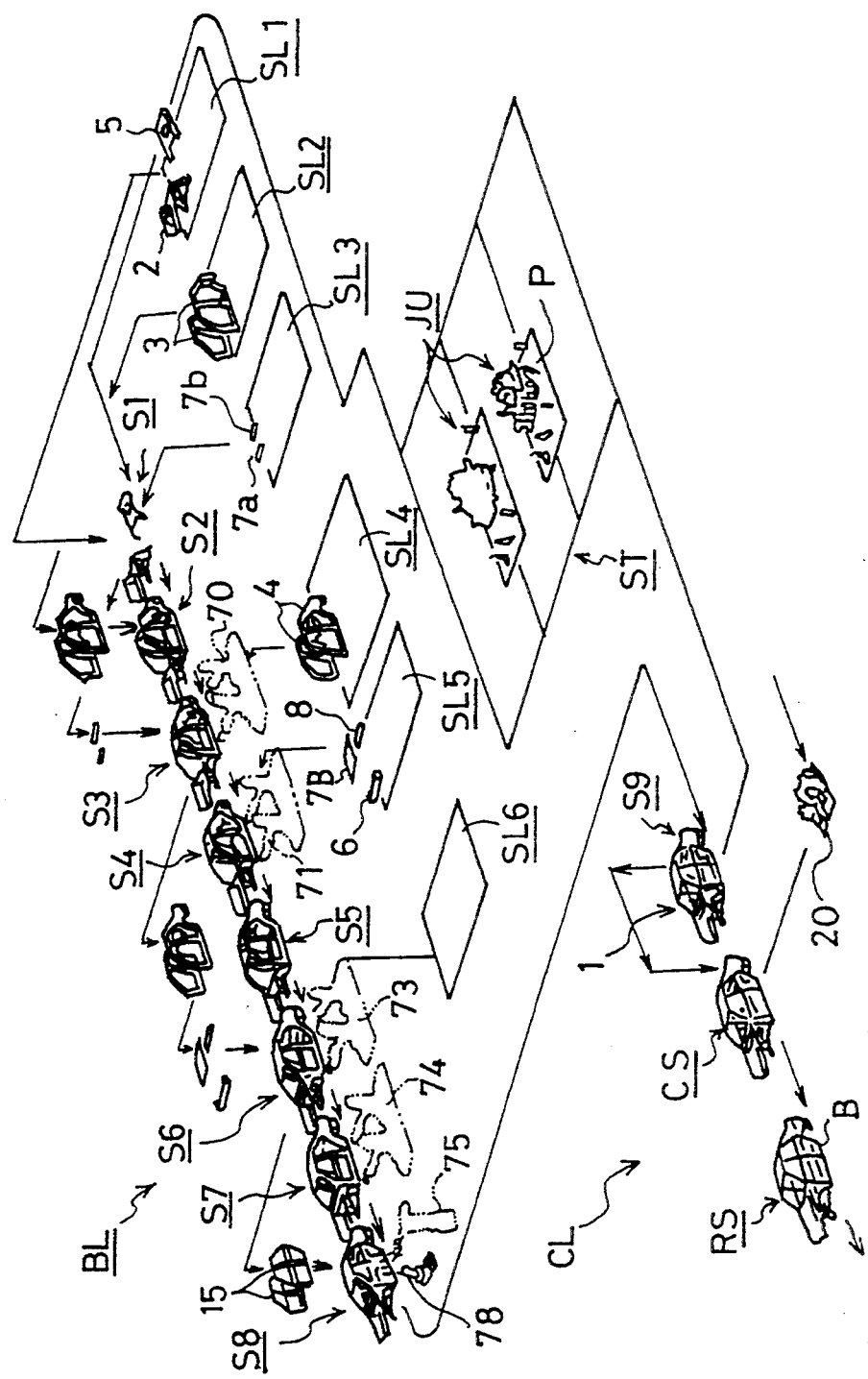

FIG. 1 shows an outline of a vehicle body assembly line BL for assembling upper vehicle body sections constituting part of vehicle bodies.

Detailed description will be made of the vehicle body assembly line BL with reference to FIG. 1.

As shown in FIG. 1, the vehicle body assembly line BL comprises nine stations S1 to S9, inclusive, composed of, from upstream to downstream, a first station S1, a second station S2, a third station S3, a fourth station S4, a fifth station S5, a sixth station S6, a seventh station S7, an eighth station S8 and a ninth station S9. To the stations S1 to S9 are conveyed jig units JU by the aid of conveying units, apparatuses or systems (not shown) which are of a general linear, lift or carrier type. In each of the stations S1 to S9, each of members for structuring vehicle bodies is aligned with the corresponding jig unit JU by employing its inner panel as a reference, or on the basis of its inner panel, and the members for structuring the vehicle body sections are mounted one after another to the corresponding jig units JU and connected one after another, thereby forming the vehicle body section (upper vehicle body section) 1.

First, the jig unit JU is described with reference to FIGS. 2 to 5.

The jig unit JU generally comprises a pallet P, a front vehicle body clamping mechanism for aligning and clamping a front vehicle body section 2, a rear floor member clamping mechanism for aligning and clamping a rear floor assembly member 5, a pair of left-hand and right-hand side panels clamping mechanisms, respectively, for aligning and clamping left-hand and right-hand inner side panels 3, cowl dash panel unit clamping mechanism for aligning and clamping a cowl-dash panel assembly unit 6, forward and rearward headers clamping mechanisms, respectively, for aligning and clamping a front header 7a and a rear header 7b, and a package tray clamping mechanism for aligning and clamping a rear package tray assembly 8.

The front vehicle body clamping mechanism for aligning and clamping the front vehicle body section 2 comprises an aligning pin 31 and a clamping unit C1, each being mounted to each of two pairs of left-hand and right-hand supporting brackets 30 disposed spaced apart in a predetermined distance at a forward portion of the pallet P of the Jig unit JU. The front end portions of left-hand and right-hand front frames of the front vehicle body section 2 as well as both end portions of a second cross-member thereof are aligned with the pallet P with the aid of the four aligning pins 31, and the front vehicle body section 2 is fixed on the pallet P with the aid of the four clamping units C1.

The rear floor assembly clamping mechanism for aligning and clamping the rear floor assembly member 5 comprises an aligning pin 33 and a clamping unit C2, each being mounted to each of two pairs of left-hand and right-hand supporting brackets 32 disposed spaced apart in a predetermined distance at a rearward portion of the pallet P of the jig unit JU. The front and rear end portions of left-hand and right-hand rear frames of the rear floor assembly member 5 are aligned with the pallet P with the aid of the four aligning pins 33, and the rear floor assembly member 5 is fixed on the pallet P with the aid of the four clamping units C2.

As have been briefly described hereinabove, the left-hand and right-hand side panels clamping mechanisms are to align the left-hand and right-hand side inner panels 3 with the pallet P, and they are disposed on left-hand and right-hand sides of a nearly central portion of the pallet P, respectively. Detailed description will be made of the left-hand side panel clamping mechanism because the left-hand and right-hand side panel clamping mechanisms are disposed in a symmetrical manner and they have the same structures.

The left-hand side panel clamping mechanism generally comprises aligning units P1, P2 and P3 as well as clamping units C3 to C7, inclusive, for aligning and clamping the left-hand inner panel 3, respectively.

On the left-hand side of a nearly longitudinal central portion of the pallet P is disposed a fixing base 34 on which in turn is disposed a supporting plate 35. The supporting plate 35 is arranged so as to be movable in the transverse direction of the vehicle body.

To the supporting plate 35 is mounted a nearly lying F-shaped supporting frame 36. A clamping unit C3 is disposed on top end portions of a pair of upstanding columns 36a disposed before and behind the supporting frame 36. The clamping unit C3 is arranged so as to clamp a roof inner rail located on the top of the side inner panel 3.

The supporting plate 35 is provided with an aligning unit P1 and a clamping unit C4. The aligning unit P1 is to align a longitudinally central portion of a central inner pillar 10 of the side inner panel 3, and the clamping unit C4 clamps the longitudinally central portion of the central inner pillar 10 thereof.

To a rearward end portion of a horizontal member 36b of the lying F-shaped supporting frame 36 are mounted the aligning unit P2 and the clamping unit C5. The aligning unit P2 is arranged to align a lower end portion of an inner rear pillar 11 of the side inner panel 3, and the clamping unit C5 is arranged to clamp the lower end portion of the inner rear pillar 11 thereof.

Further, a supporting base 37 is disposed on the pallet P in front of the fixing base 34. On the supporting base 37 is supported a movable plate 38 so as to be movable in the longitudinal direction of the vehicle body. In addition, a supporting plate 39 is supported on the movable plate 38 so as to be movable in the transverse direction thereof. On the supporting plate 39 is mounted an upstanding column 40, and a nearly square C-shaped supporting frame 41 is disposed on the top of the upstanding column 40. An aligning unit P3 and a clamping unit C6 are mounted to the upper portion of the generally square C-shaped supporting frame 41.

The aligning unit P3 is arranged so as to align a lower end portion of a front inner pillar 12 of the side inner panel 3, and the clamping unit C6 is arranged to clamp the inner front pillar 12 thereof. On the other hand, the clamping unit C7 is mounted to a lower portion of the supporting frame 41 for clamping the lower portion of a forward end portion of the side inner panel 3.

As described hereinabove, the side inner panels 3 are aligned with the aid of the aligning units P1 to P3 and clamped by the clamping units C3 to C7.

The cowl-dash panel clamping mechanism is arranged to align and clamp the cowl-dash panel assembly unit 6. The cowl-dash panel clamping mechanism comprises an aligning pin 42 and a clamping unit C8, which are disposed on upper portions of the left-hand and right-hand supporting frames 41. The aligning pin 42 and the clamping unit C8 are supported through a cylinder 57 (FIG. 5) so as to be movable in a vertical direction. A rearward end portion of the cowl-dash panel assembly unit 6 composed of a cowl panel 13 and a lower dash panel 14 is aligned with the aid of the aligning pin 42, and the cowl-dash panel assembly unit 6 is then clamped by the clamping unit C8.

In addition, the header clamping mechanism comprises an aligning unit P4a and a clamping unit C9a, each being mounted to each of arm sections 44a positioned in the front of a supporting frame 44 which in turn is interposed between the upper end portions of the forward and rearward upstanding columns 43 interposed between the left-hand and right-hand fixing bases 34 of the pallet P. The aligning unit P4a is so disposed as to align an end portion of the front header 7a from below, and the front header 7a is then clamped by the clamping unit C9a.

The supporting frame 44 has a pair of left-hand and right-hand two-branch arm sections 44b disposed at its rearward end, and an aligning unit P4b and a clamping unit C9b are mounted to a rear end portion of each of the left-hand and right-hand two-branch arm sections 44b. The aligning unit P4b is arranged to align an end portion of the rear header 7b with the pallet P from below, and the clamping unit C9b is arranged to clamp the rear header 7b.

In other words, the front header 7a is aligned with the pallet P with a pair of the aligning units P4a and then clamped with the aid of a pair of the clamping units C9a, and the rear header 7b is aligned with the pallet P with the aid of a pair of the aligning units P4b and then clamped with the aid of a pair of the clamping units C9b. After the front and rear headers 7a and 7b have been clamped, they are fixed to the clamping units.

Furthermore, an aligning unit P5 and a clamping unit C10 are mounted to an end portion of each of left-hand and right-hand arm sections 44c positioned at a central portion of the supporting frame 44. The aligning unit P5 is arranged for aligning an end portion of a roof bow 7c assembled with a roof outer panel 7B, and the clamping unit C10 is for clamping the roof bow 7c.

Figure 6:
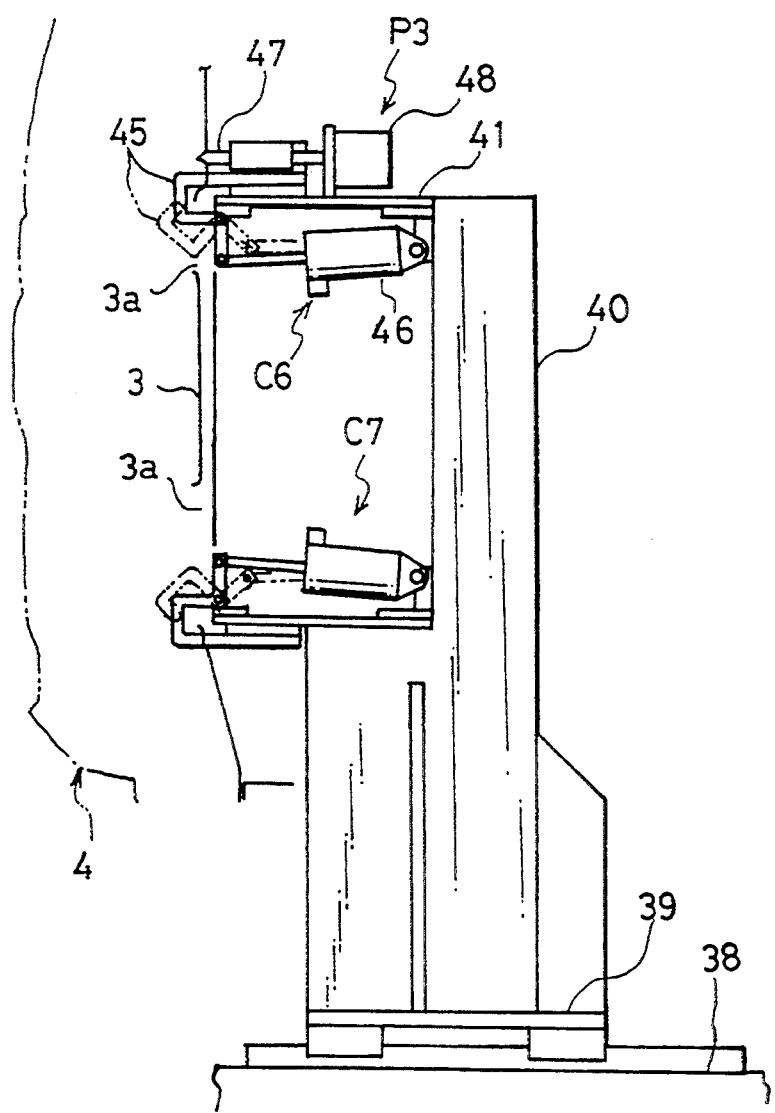

The clamping units C1 to C10, inclusive, are of a conventional toggle type and each of them comprises a clamping lever 45 of a nearly crank form and an air cylinder 46 for driving a pivotal movement of the clamping lever 45, as shown in FIG. 6.

The aligning units P1 to P5, inclusive, are of a general configuration having an aligning pin 47 and an air cylinder 48 for driving forward and rearward movement of the aligning pin 47.

It is noted herein that, as shown in FIG. 6, the clamping units C6 and C7 for the side panel clamping mechanism are so arranged as to clamp the side inner panel 3 by inserting the respective clamping levers 45 through an opening section 3a formed in the side inner panel 3.

The package tray assembly clamping mechanism has a supporting plate 50 disposed on a rear upper surface of each of the left-hand and right-hand fixing bases 34. On the supporting plate 50 is supported a supporting member 51 so as to be movable in the longitudinal direction of the vehicle body. On the rear side of the supporting member 51 is supported a movable plate 53 having a pair of left-hand and right-hand supporting brackets 52, each extending rearward, so as to be movable vertically. The movable plate 53 is lifted or lowered by a cylinder 54.

To the supporting bracket 52 are disposed four aligning pins 55 for aligning the rear package tray assembly 8 and a pair of left-hand and right-hand clamping units C11 for clamping the rear package tray assembly 8.

The clamping units C3 to C5 and the aligning units P1 and P2 are mounted to the jig unit JU through the supporting frame 36, and the clamping units C6 to C8, the aligning units P3 and the aligning pin 42 are mounted to the Jig unit JU through the upstanding columns 40, the movable plate 38 and the supporting plate 39. Further, the clamping units C11 and the aligning pin 55 are mounted to the jig unit JU through the supporting member 51 and the movable plate 53.

Figure 3:
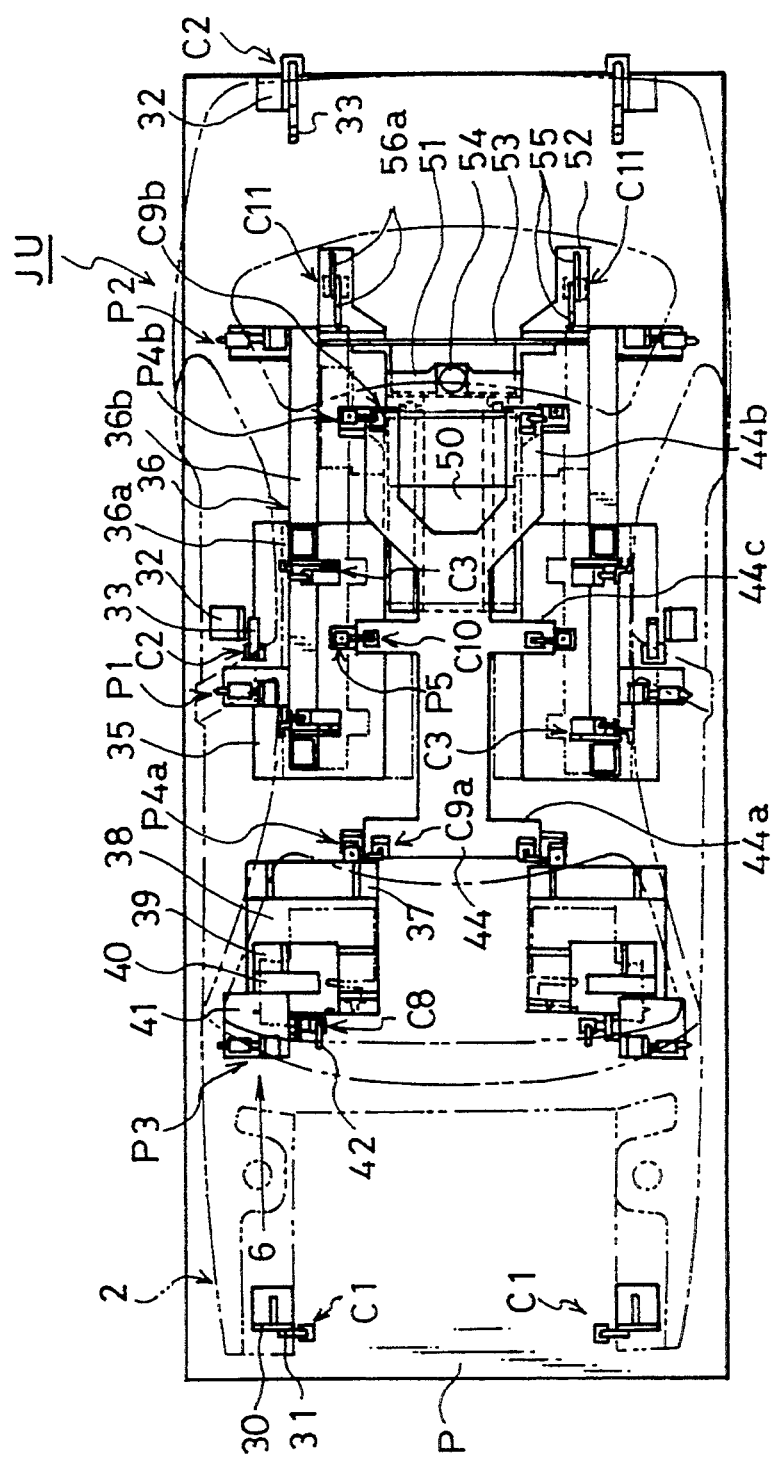

As shown in FIG. 3, the aligning units and the clamping units are transferred by a driving mechanism (not shown) to the mounting position, as indicated by the solid line in FIG. 3, when the members for structuring vehicle bodies are mounted to the jig unit JU. On the other hand, the aligning units and the clamping units are transferred to the evacuating position, as indicated by the phantom line in FIG. 3, so as to allow the jig unit JU to be evacuated from the floor opening section 1a (FIG. 5) without causing the jig unit JU to interfere with the upper vehicle body section 1, after the upper vehicle body section has 1 been assembled.

Then, description will now be made of the vehicle body structuring members to be supplied to the white vehicle body line BL with reference to FiG. 1.

The front vehicle body section 2 comprises left-hand and right-hand front frames, left-hand and right-hand wheel aprons, a lower dash panel, a lower dash member (a second cross-member), and so on, and the front vehicle body section 2 is assembled in a first sub-assembly line SL1. It is to be noted herein that a shroud panel constituting a front end of the upper vehicle body section 1 is connected to the upper vehicle body section 1 after the upper vehicle body section has been assembled with the under vehicle body section and an internal combustion engine has been loaded on or to the vehicle body 1.

The rear floor assembly member 5 comprises a rear floor panel, left-hand and right-hand rear frames, a fourth cross-member, a rear cross-member, a trunk floor, and a rear end panel, and the rear floor assembly member 5 is assembled in the first sub-assembly line SL1.

Each of the left-hand and right-hand side inner panels 3 comprises an inner panel body, an inner roof rail, an impact bracket, a wheel housing, suspension reinforcing members and so on. The left-hand and right-hand side inner panels 3 are assembled in a second subassembly line SL2.

The front header 7a and the rear header 7b, serving as roof inner members of the roof panel, comprise each a header inner panel and a header outer panel, and they are assembled in a third sub-assembly line SL3.

Each of the left-hand and right-hand side outer panels 4 comprises an outer panel body, a front hinge reinforcing member, a rear hinge reinforcing member, a center pillar reinforcing member, a rear striker reinforcing member, a corner plate and so on. The side outer panel 4 is assembled in a fourth sub-assembly line SL4.

The roof outer panel 7B comprises an outer panel body and a roof bough 7c, and the rear package tray assembly 8 comprises a package tray, a bracket and so on. Further, the cowl-dash panel assembly unit 6 comprises the cowl panel and the dash panel. These members are assembled in a fifth sub-assembly line SL5.

A bonnet and a trunk lid, serving as the lid members, are assembled in a sub-assembly line (not shown). Each of four side doors 15 comprises a door inner panel, a door outer panel, a sash, a window glass panel, a window regulator and so on, and they are assembled in a sixth sub-assembly line SL6.

Now, description is made of the procedures for assembling the upper vehicle body section 1 of the white vehicle body section with reference to FIGS. 1 and 7 to 12. The operations for the assembly of the upper vehicle body section in each of the stations S1 to S9 are described in the order from upstream to downstream. In FIG. 1, the jig unit JU is excluded from the illustration and the stations S2 to S7 correspond to plural connecting stations.

FIRST STATION S1

Figure 7:
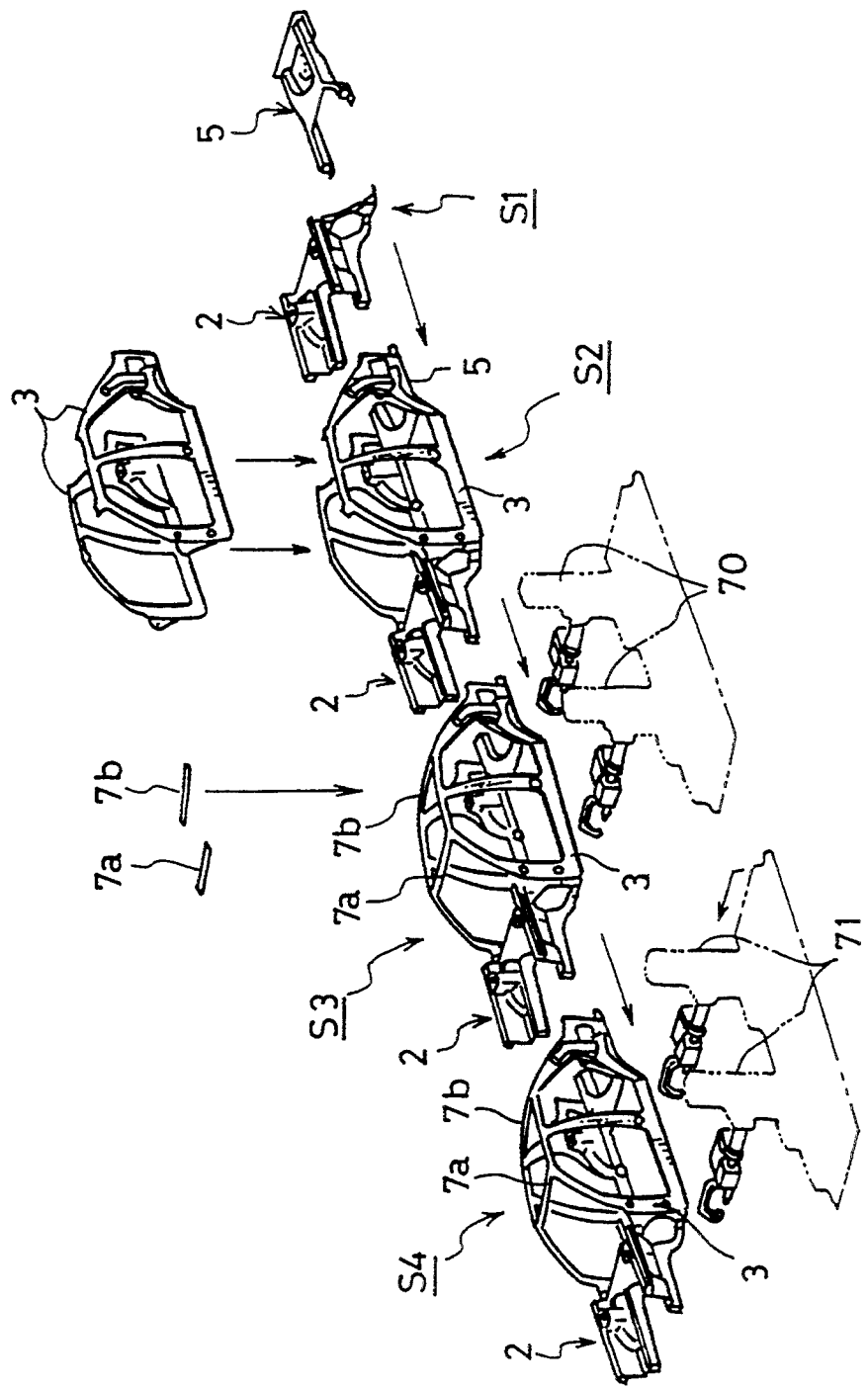

In the first station S1, as shown in FIG. 7, the jig unit JU conveyed from a jig stock station ST is positioned and aligned. The front vehicle body section 2 and the rear floor assembly member 5 are aligned with the jig unit JU and then clamped. The front vehicle body section 2 and the rear floor assembly member 5 are supplied from the first sub-assembly line SL1.

Figure 2:
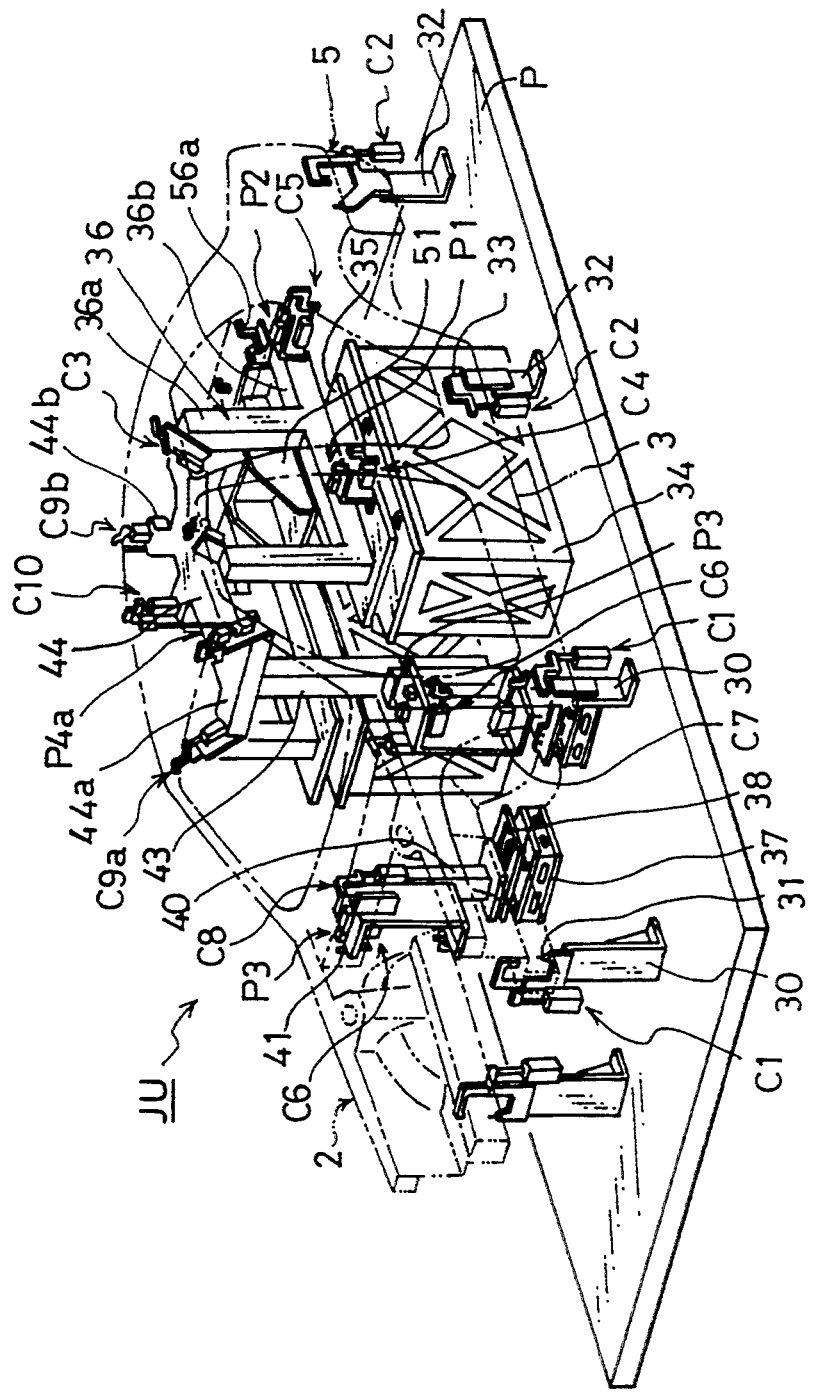

As shown in FIG. 2, the front vehicle body section 2 is aligned with the jig unit JU with the aid of the four aligning pins 31 with high accuracy and then clamped by the four clamping units C1 of the jig unit JU. Further, the rear floor assembly member 5 is aligned with the jig unit JU with the four aligning pins 33 with high accuracy and then clamped by the four clamping units C2 of the jig unit JU.

SECOND STATION S2

In the second station S2, as shown in FIG. 7, the jig unit JU conveyed from the first station S1 is aligned. The left-hand and right-hand side inner panels 3 are supplied from the second sub-assembly line SL2 to the second station S2 and then aligned with the FIG. unit JU with high accuracy with the aid of the aligning units P1 to P3, inclusive. Thereafter, they are clamped with the clamping units C3. to C7, inclusive.

Brief description will now be made of a conveyor system 60 for conveying the left-hand and right-hand side inner panels 3 to the second station S2 from the first station S1.

Figure 10:
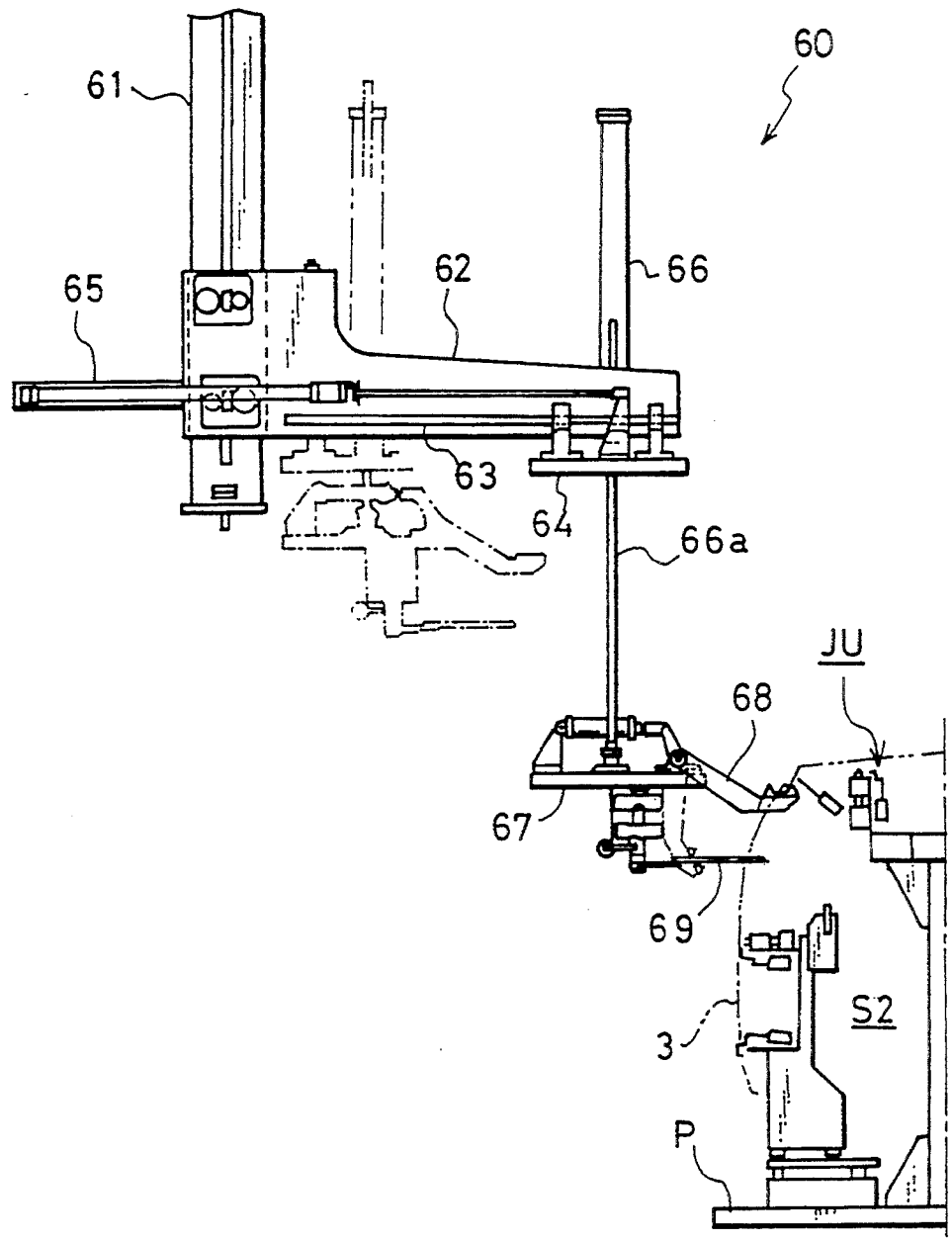

As shown in FIG. 10, a guide rail (not shown) is provided in a region located over the downstream end portion of the second sub-assembly line SL2 and in a region located over the second station S2. To the guide rail are mounted left-hand and right-hand upstanding frames 61 extending downward and disposed so as to be movable. Each of the upright frames 61 supports an arm 62 in an overhung state so as to be movable in a vertical direction, and the arm 62 is elevated or lowered with the aid of a mechanism for driving the elevation or lowering of the arm 62, although not shown, disposed on an upper end portion of the upstanding frame 61.

To a side surface of each of the arms 62 is mounted a horizontally extending guide rail 63 which in turn supports a base plate 64 to be operatively driven by a cylinder 65 so as to be movable in left-hand and right-hand directions, as shown in the drawing. To the base plate 64 is a cylinder 66 extending in a vertical direction, and a movable plate 67 is mounted to the lower end portion of a piston rod 66a of the cylinder 66. To the movable plate 67 are pivotally mounted a supporting arm 68 so disposed as to be inserted into a door opening section of each of the side inner panels 3 and an arm 69 disposed pivotally so as to prevent the side inner panel 3 from swinging. The side inner panel 3 is supported by the movable plate 67 through the supporting arm 68 and it is conveyed from the first station S1 to the second station S2 with the side inner panel 3 held on the arm 69 without causing the side inner panel 3 from swinging during conveyance.

THIRD STATION S3

As shown in FIG. 7, the front header 7a and the rear header 7b are supplied from the third sub-assembly line SL3 to the third station S3 and are mounted to the jig unit JU that has already been aligned.

Figure 4:
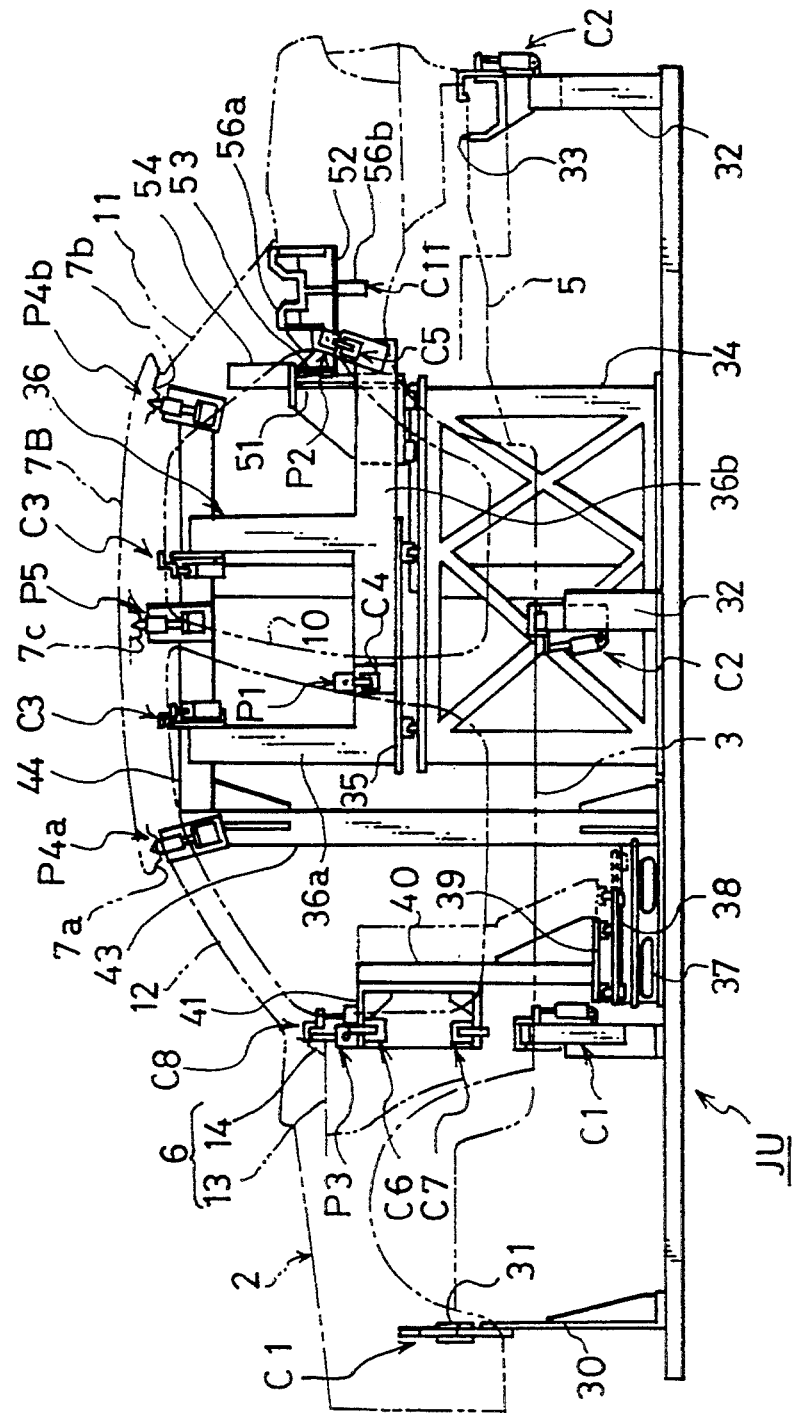
Figure 5:
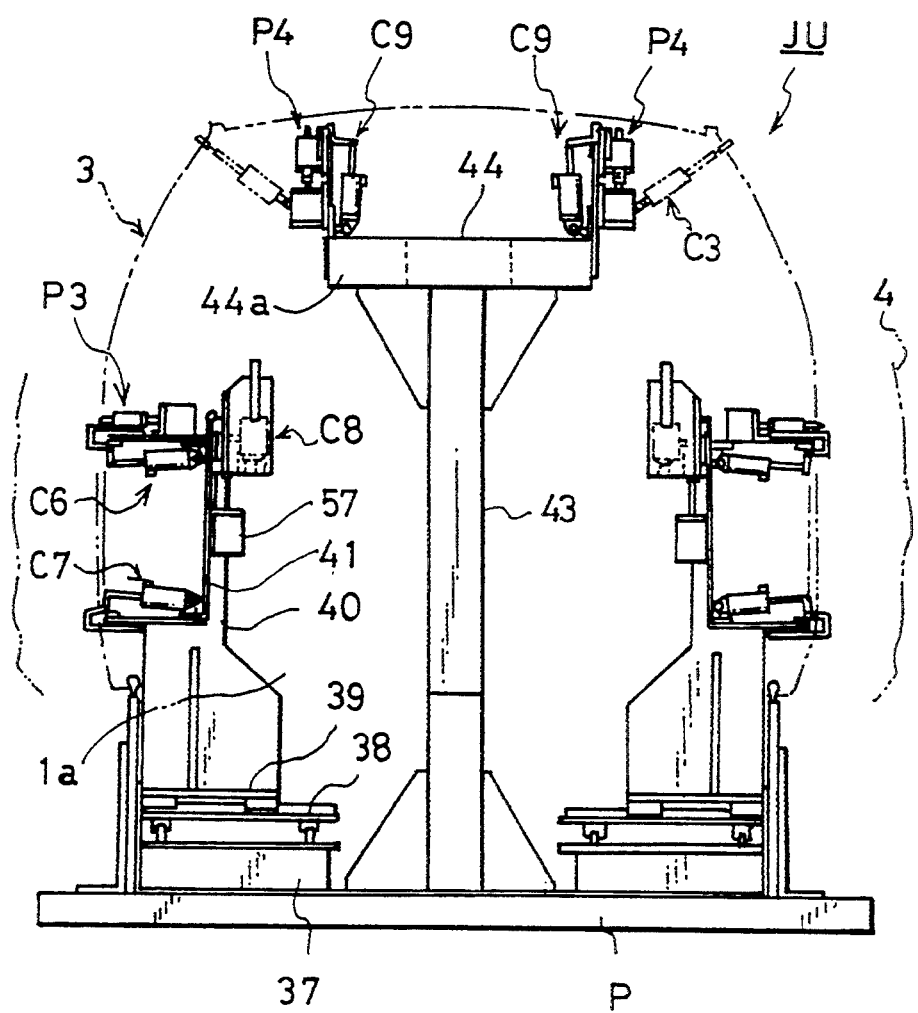

As specifically shown in FIG. 4, the front header 7a and the rear header 7b are aligned with the aid of the aligning units P4a and P4b and then clamped by the clamping units C9a and C9b, respectively, with high accuracy, followed by temporarily welding the both side end portions of each of the front header 7a and the rear header 7b to the left-hand and right-hand side inner panels 3 with the aid of two welding robots 70 disposed in the third station S3. Further, each of the end sides of the side inner panel 3 is temporarily welded to the left-hand and right-hand side inner panels 3, respectively, and the side inner panels 3 are in turn temporarily welded to the rear floor assembly member 5.

FOURTH STATION

In the fourth station S4, as shown in FIG. 7, the left-hand and right-hand side inner panels 3 are supplementarily or permanently welded to the front vehicle body section 2 and the rear floor assembly member 5 with the aid of another two welding robots 71. Further, the front header 7a and the rear header 7b are connected to the left-hand and right-hand side inner panels 3.

FIFTH STATION S5

Figure 8:
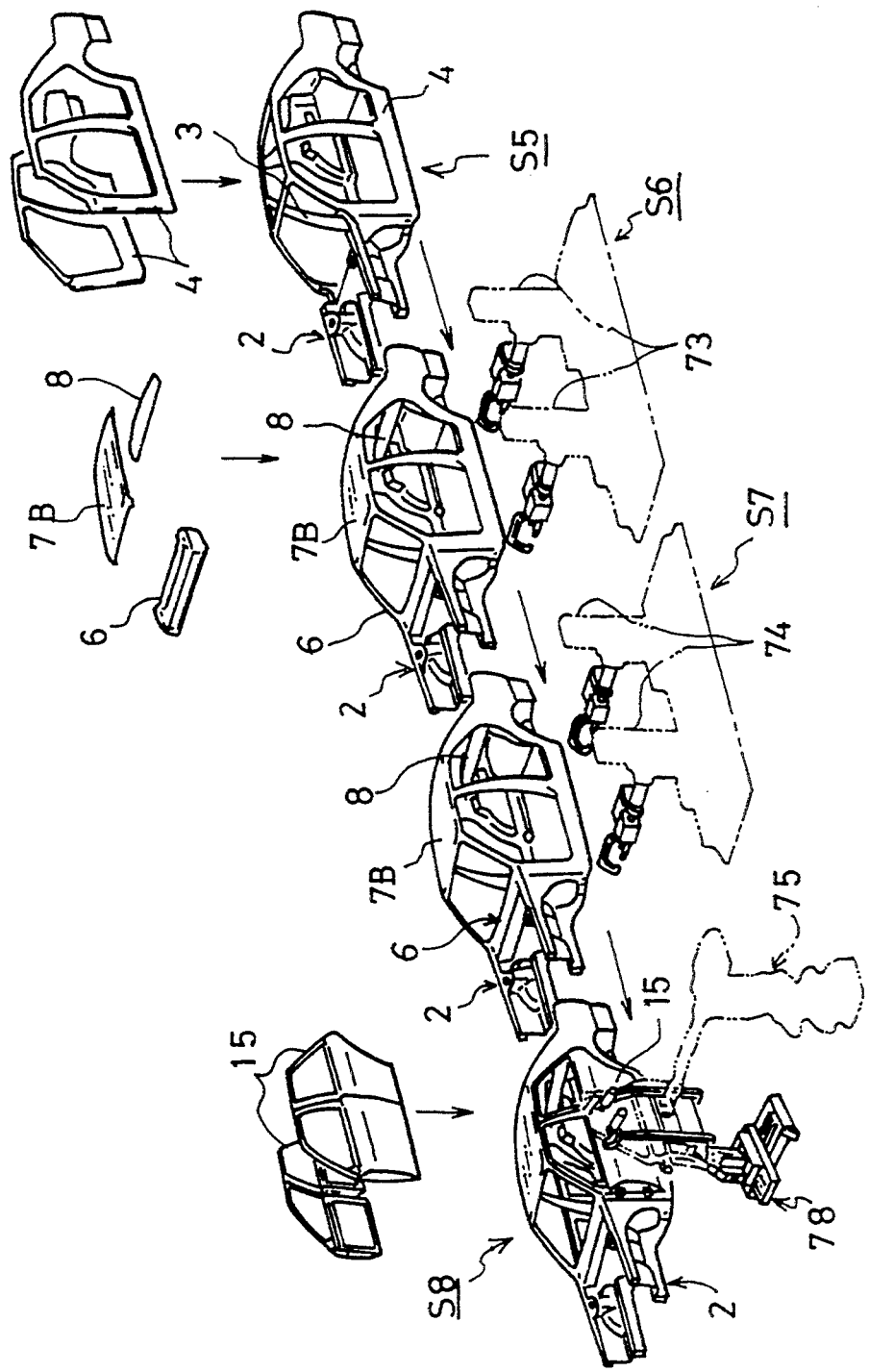

As shown in FIG. 8, the left-hand and right-hand side outer panels 4 are supplied from the fourth sub-assembly line SL4 to the fifth station S5 as well as aligned with and fixed to the left-hand and right-hand side inner panels 3 fixed to the FIG. Unit JU.

SIXTH STATION

In the sixth station S6, as shown in FIG. 8, the roof outer panel 7B, the cowl-dash panel assembly unit 6, and the rear package tray assembly 8 are supplied from the fifth sub-assembly line SL5 and mounted to the jig unit JU.

As shown in FIG. 3, the roof outer panel 7B is aligned with the jig unit JU with the aid of the aligning units P5 with high accuracy and then clamped to the jig unit JU with the aid of the clamping units C10. Further, the cowl-dash panel assembly unit 6 is aligned with the jig unit JU with the aid of the aligning pin 42 with high accuracy and then fixed to the jig unit JU with the aid of the clamping units C8. In addition, the rear package tray assembly 8 is aligned with the jig unit JU with the aid of the aligning pins 55 with high accuracy and then clamped with the Jig unit JU with the aid of the clamping units C11.

Thereafter, the side outer panel 4 is welded temporarily to the side inner panel 3 with the aid of the two welding robots 73. Likewise, the cowl-dash panel assembly unit 6 is welded temporarily to the side inner panel 3 and the front vehicle body section 2. Further, the roof outer panel 7B is temporarily welded to the front and rear headers 7a and 7b as well as to the side outer panel 4. In addition, the rear package tray assembly 8 is temporarily welded to the side inner panel 3 and the rear floor assembly member 5.

SEVENTH STATION S7

In the seventh station S7, as shown in FIG. 8, the vehicle body structuring members welded temporarily in the sixth station S6 and conveyed to the seventh station S7 therefrom are further welded supplementarily or permanently with the aid of two welding robots 74.

EIGHTH STATION S8

Figure 11:
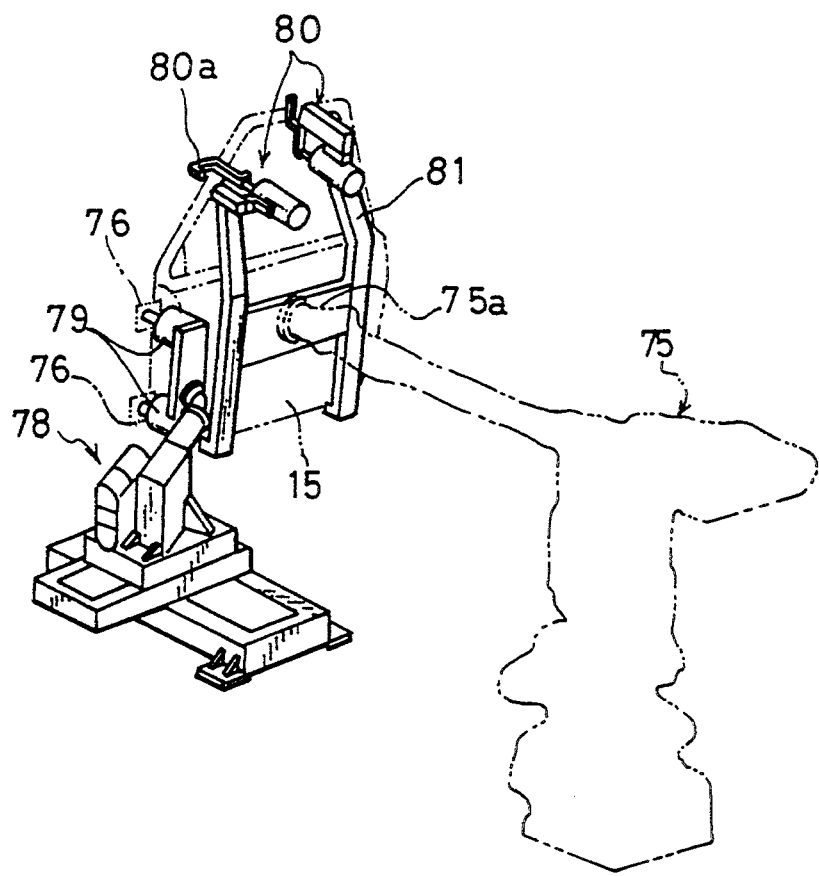

In the eighth station S8, as shown in FIGS. 8 and 11, front and rear side doors 15 are supplied one after another from the sixth sub-assembly line SL6 with the aid of left-hand and right-hand robots 75. The side doors 15 are temporarily mounted to the corresponding side outer panels 4 by coupling a pair of upper and lower hinge members 76 disposed on the side doors 15 with nut runners 79 of a coupling unit 78.

The robot 75 is of a conventional multi-joint structure and, more specifically, it has a hand 75a to which is mounted a frame member 81 through a pair of toggle clamping units 80 disposed so as to allow their clamping levers 80a to be inserted through a window opening section into the side inner door 15 and to hold the door sash. Likewise, the lid members such as the bonnet and the trunk lid are temporarily mounted to the vehicle body section 1 in the eighth station S8.

NINTH STATION S9

Figure 9:
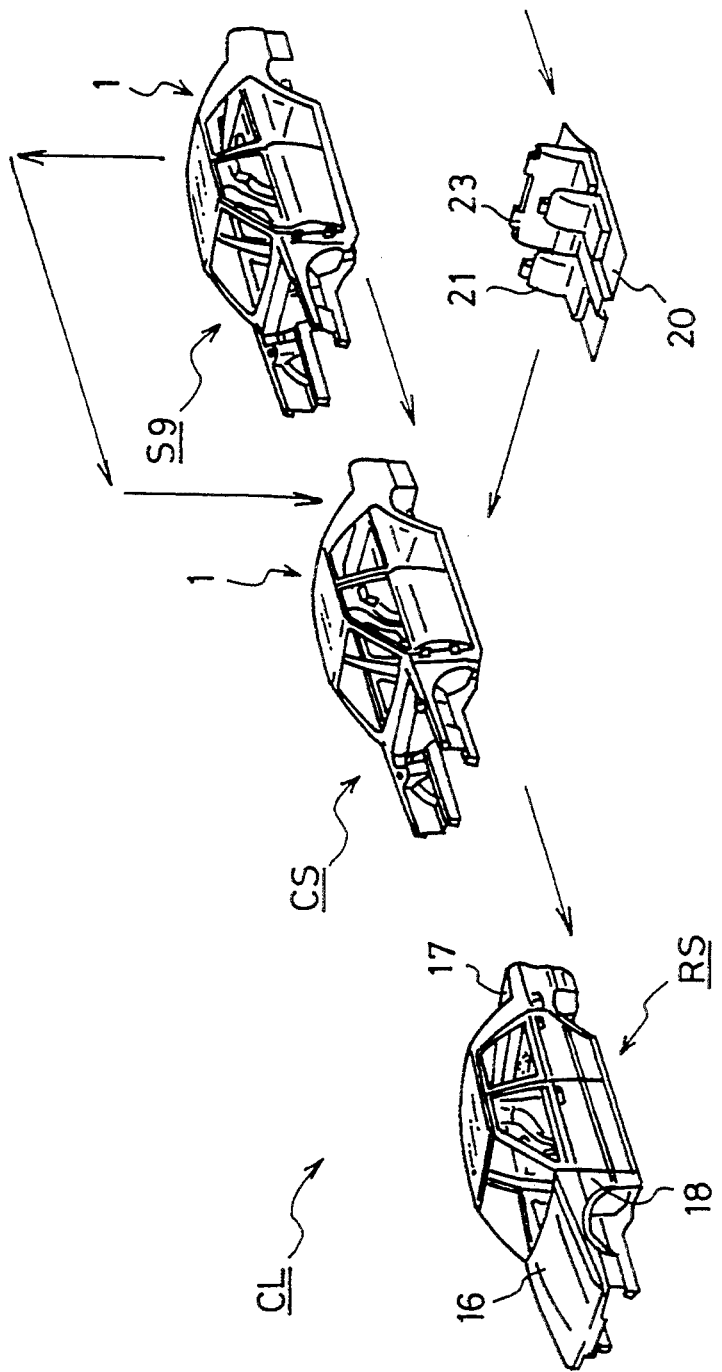
Figure 12:
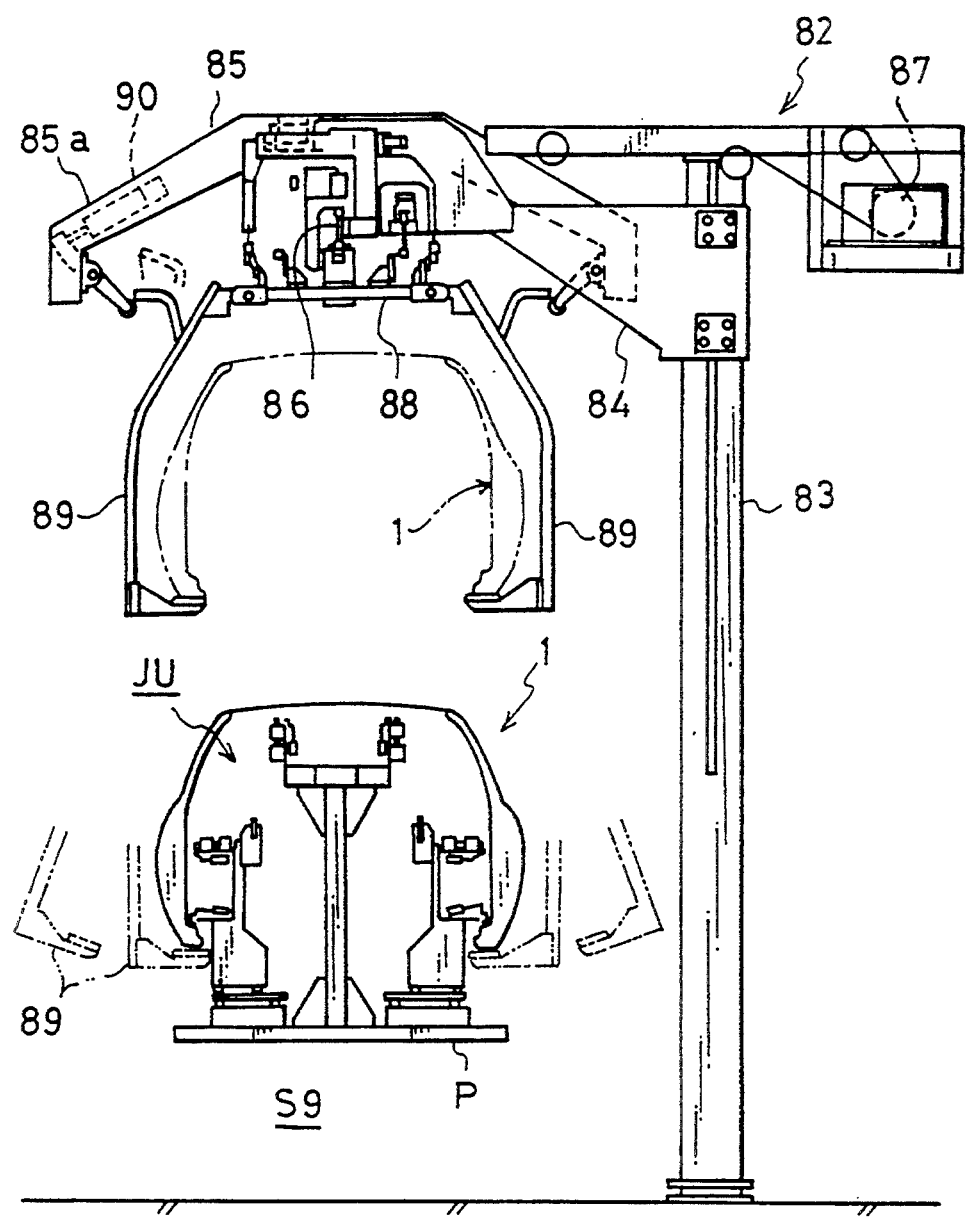

In the ninth station S9, as shown in FIGS. 9 and 12, the vehicle body section 1 assembled through the first stations S1 to the eighth station S8 is lifted with the aid of a lifting-lowering unit 82, thereby allowing the FIG. Unit JU to be evacuated and removed downward from the vehicle body section 1. Thereafter, the jig unit JU is transferred to the stock station ST and the vehicle body section 1 is transferred to a transferring station CS of the vehicle bodies assembly line CL.

Figure 13:
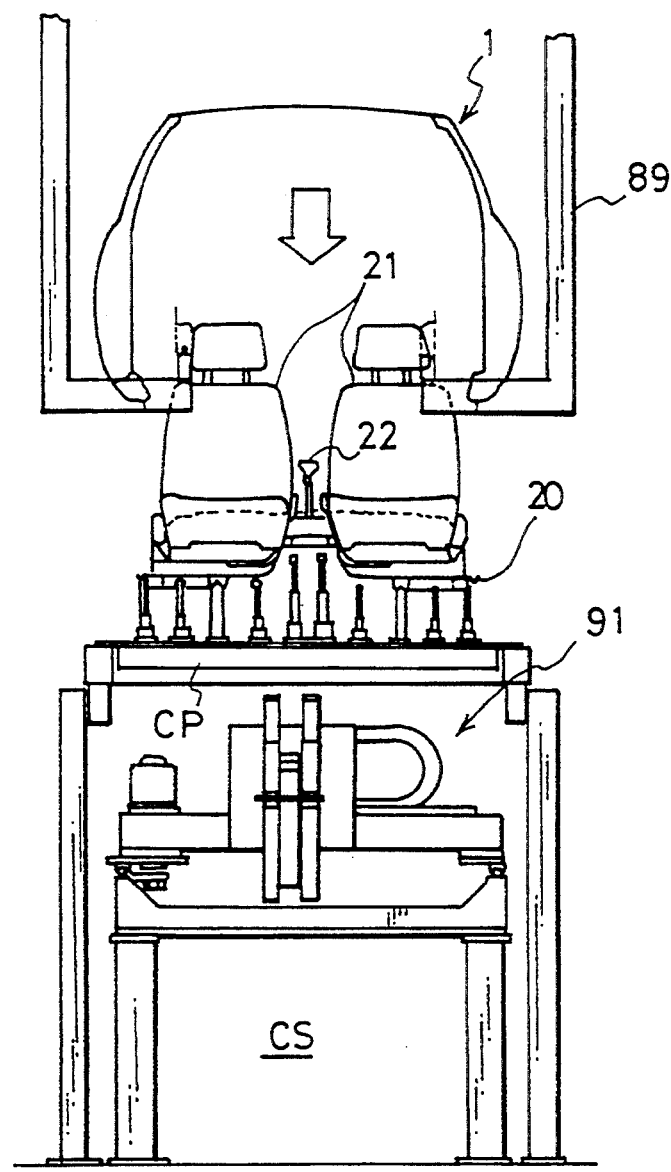

As shown in FIGS. 12 and 13, the lifting-lowering unit 82 is disposed in the ninth station S9 and the transferring station CS and it comprises upstanding columns 83 disposed in a longitudinally spaced relationship apart at predetermined intervals and a lifting-lowering arm 84 is supported by each of the upstanding columns 83 so as to be vertically movable along the upstanding column 83. To a top end portion of the lifting-lowering arm 84 is mounted a supporting frame 85, and a guide rail 86 is disposed between a forward supporting frame 85 and a rearward supporting frame 85. The guide rail 86 is also arranged so as to be lifted or lowered together with the supporting frames 85 and the lifting-lowering arm 84 by a driving mechanism 87.

The guide rail 86 has a base plate 88 suspended so as to be movable in the longitudinal direction, and the base plate 88 has four supporting arms 89 mounted at its four corner portions so as to pivotally support the upper vehicle body section 1 from below. Each of the supporting arms 89 is driven to be closed to assume a supporting position for supporting the upper vehicle body section 1, as indicated by the one-dot-and-dash line in FIG. 12, or to be opened to assume a releasing position for releasing the upper vehicle body section 1, as indicated by two-dots-and-dash line in FIG. 12, through a cylinder 90 disposed to an arm section 85a of the supporting arm 85. The upper vehicle body section 1 is conveyed from the ninth station S9 to the transferring station CS in such a state that the upper vehicle body section 1 is supported and suspended by the supporting arms 89 in the manner as indicated by the solid line in FIG. 12. When the upper vehicle body section 1 is lowered and evacuated from the supporting arms 89, it is assembled with a main floor member 20 in the vehicle body assembly line CL, on which various parts, units and accessories have been mounted as shown in FIG. 13.

Figure 14:
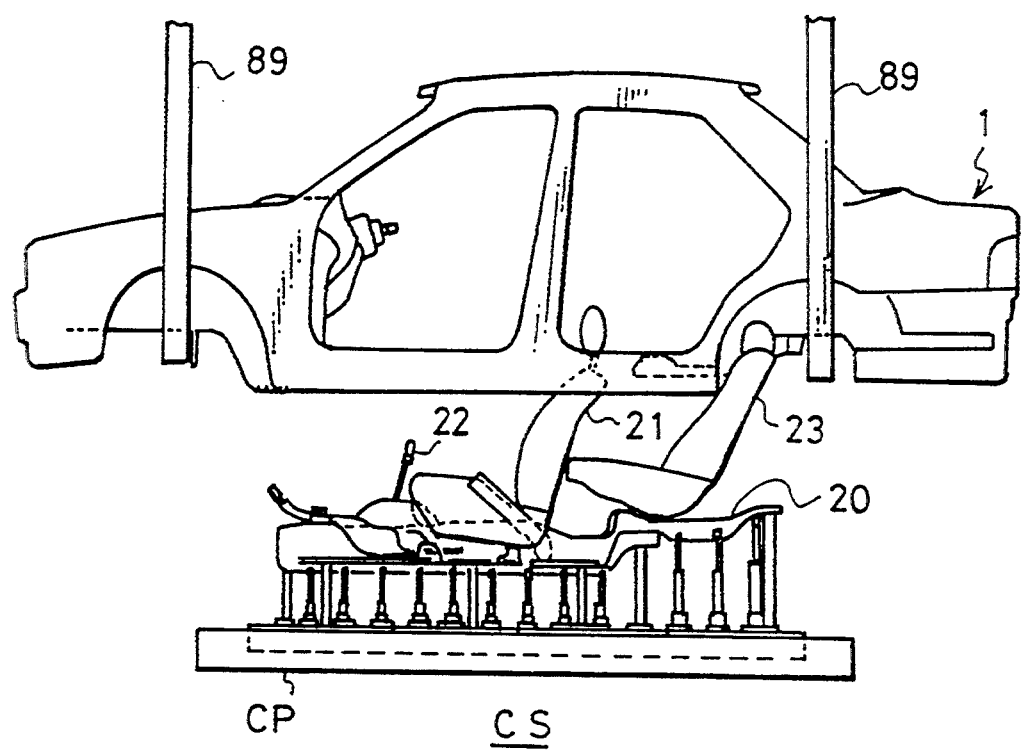

Referring now to FIGS. 13 and 14, description will be made of an outline of the vehicle body assembly line CL. The main floor member 20 is conveyed from one station (not shown) to another station (not shown) in such a state that it is placed on the jig unit JU and aligned with a pallet P disposed thereon, and various units, parts and accessories are mounted one after another to the main floor member 20 while the main floor member 20 is being conveyed and transferred from one station to another. The various units, parts and accessories include, for example, a floor mat, left-hand and right-hand seat belts, left-hand and right-hand front seats 21, a change-over lever 22, as well as left-hand and right-hand rear seats 23. The main floor member 20 on which the various parts and so on have been mounted is then conveyed to the transferring station CS. At a lower portion of the transferring station CS is disposed a mounting device 91 which in turn aligns the main floor member 20 with the upper vehicle body section 1 which is to be supplied from the ninth station and which welds the main floor member 20 to the upper vehicle body section 1 lowered thereto. Thereafter, as shown in FIG. 9, the resulting vehicle body assembly is then conveyed to the station RS for mounting the lid members, in which the lid members such as a bonnet 16, a trunk lid 17 as well as left-hand and right-hand front fenders 18 are mounted to the vehicle body assembly.

As described hereinabove, the vehicle body side panels 3 and 4 as well as the roof panel are aligned with the jig unit JU and then mounted thereto, so that neither brackets nor stays nor bolts are required for mounting the vehicle body side panels and the roof panel, unlike conventional procedures. The use of the jig unit JU can simplify the structures of the vehicle body side panels and the roof panel and omit the conventional step for temporarily mounting a portion of the vehicle body.

Further, as the Jig unit JU is arranged for exclusive use with the upper vehicle body section 1 with no floor panel mounted thereto, the jig unit JU can easily be evacuated from an floor opening of the upper vehicle body section 1 after the mounting to the upper vehicle body section 1 has been finished. Hence, the jig unit JU can be made large in size as long as it can be evacuated from the floor opening of the upper vehicle body section 1, and the jig unit JU can be provided with so many functional units that the function of the jig unit JU can easily be made multiple. The jig unit JU can be made so large in size and multiple in function that the upper vehicle body section 1 can be mounted with high efficiency and accuracy.

To the jig unit JU may be mounted many units, parts and tools, including clamping units, electrodes for welding, heads and small-sized welding robots.

Further, after the upper vehicle body section 1 has been evacuated from the jig unit JU, the main floor member 20 is mounted to the upper vehicle body section 1. Before being mounted to the upper vehicle body section 1, various parts, units and accessories, such as seats, are mounted to the main floor member 20 so that the mounting of the parts, units and accessories can be implemented with ease and efficiency.

Other Embodiments

Figure 15:
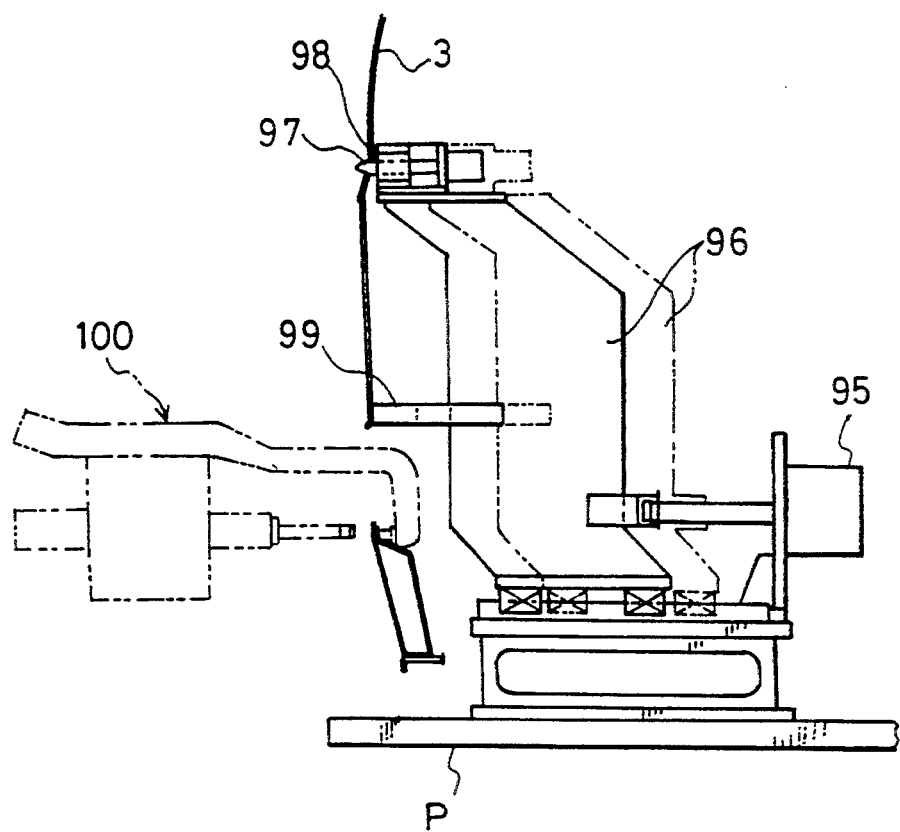
FIG. 15 is a side view showing a part of the jig unit of a second embodiment of the present invention and showing an aligning mechanism for aligning a front end portion of the side inner panel.

FIGS. 15 et seq are directed to other embodiments of the present invention. The same elements are provided with the same reference symbols as for the first embodiment of the present invention as described hereinabove. Description of the same elements will be omitted.

Second Embodiment (FIG. 15)

FIG. 15 shows the mechanism for aligning the front end portion of each of the inner side panels 3. To the jig unit JU is mounted a supporting member 96, disposed so as to be movable longitudinally by a cylinder 95, which is provided at its top end with an aligning pin 97 and with an aligning section 98. An aligning section 99 for aligning a lower portion of the inner side panel 3 may be mounted in a vertically middle position of the supporting member 96. The inner side panel 3 is clamped with a clamping unit mounted to the supporting member 96. In FIG. 15, reference numeral 100 denotes a welding gun for temporarily welding the inner side panels 3 in the third station S3.

Figure 16:
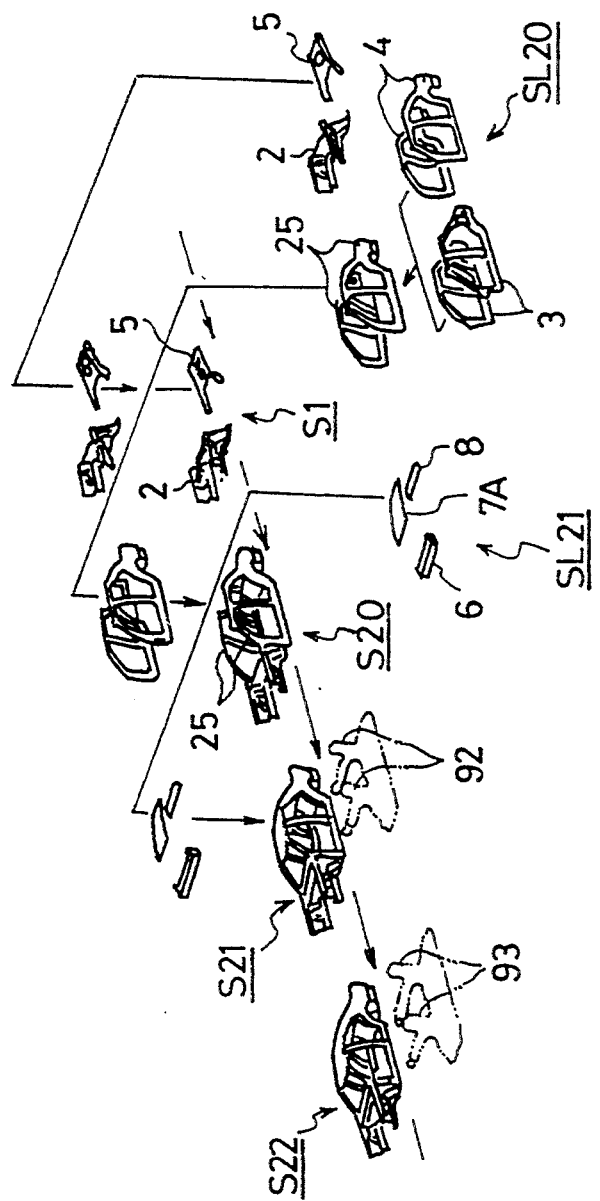
FIG. 16 is a schematic representation showing an essential portion of a vehicle body assembly line for the assembly of the vehicle body section according to a third embodiment of the present invention.
Figure 17:
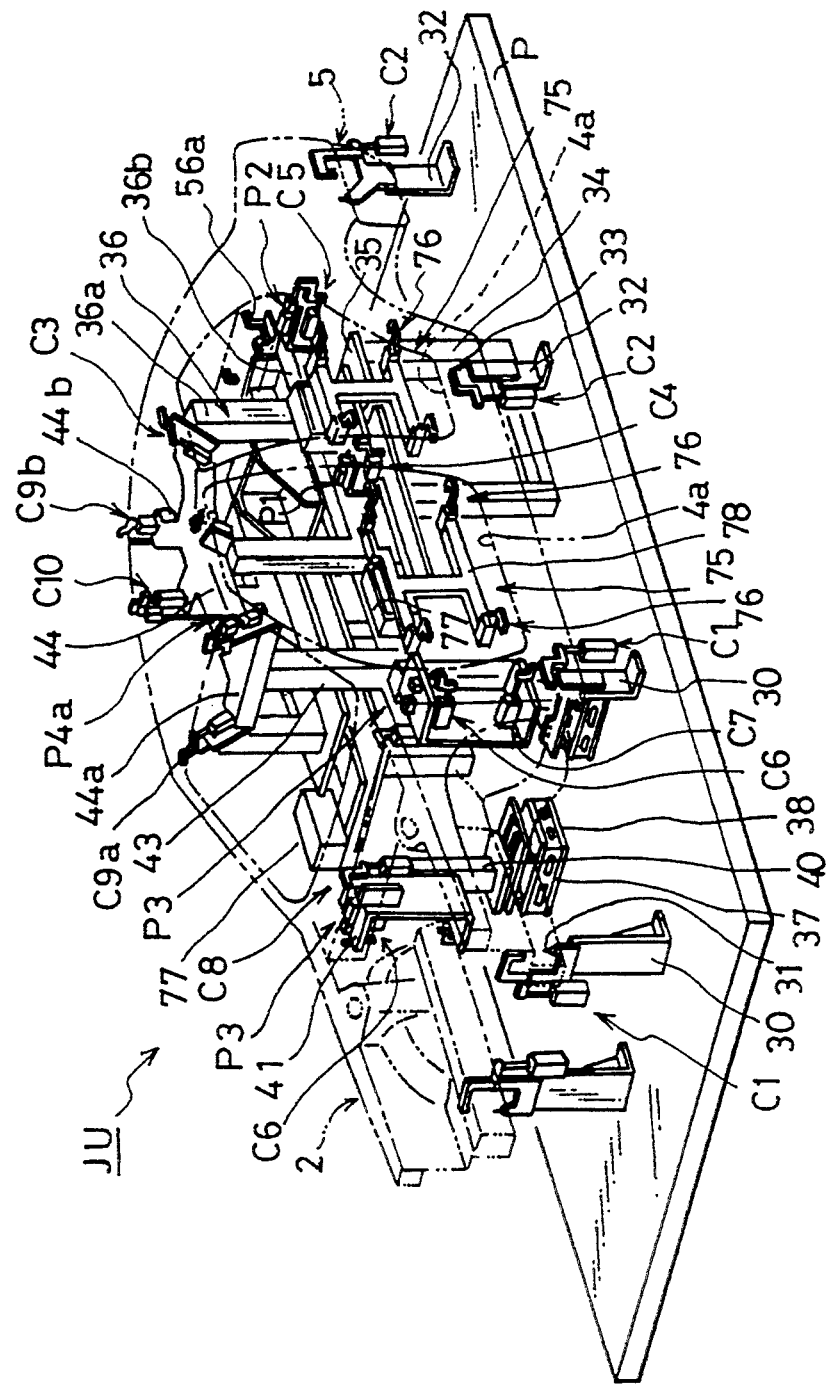
Figure 18:
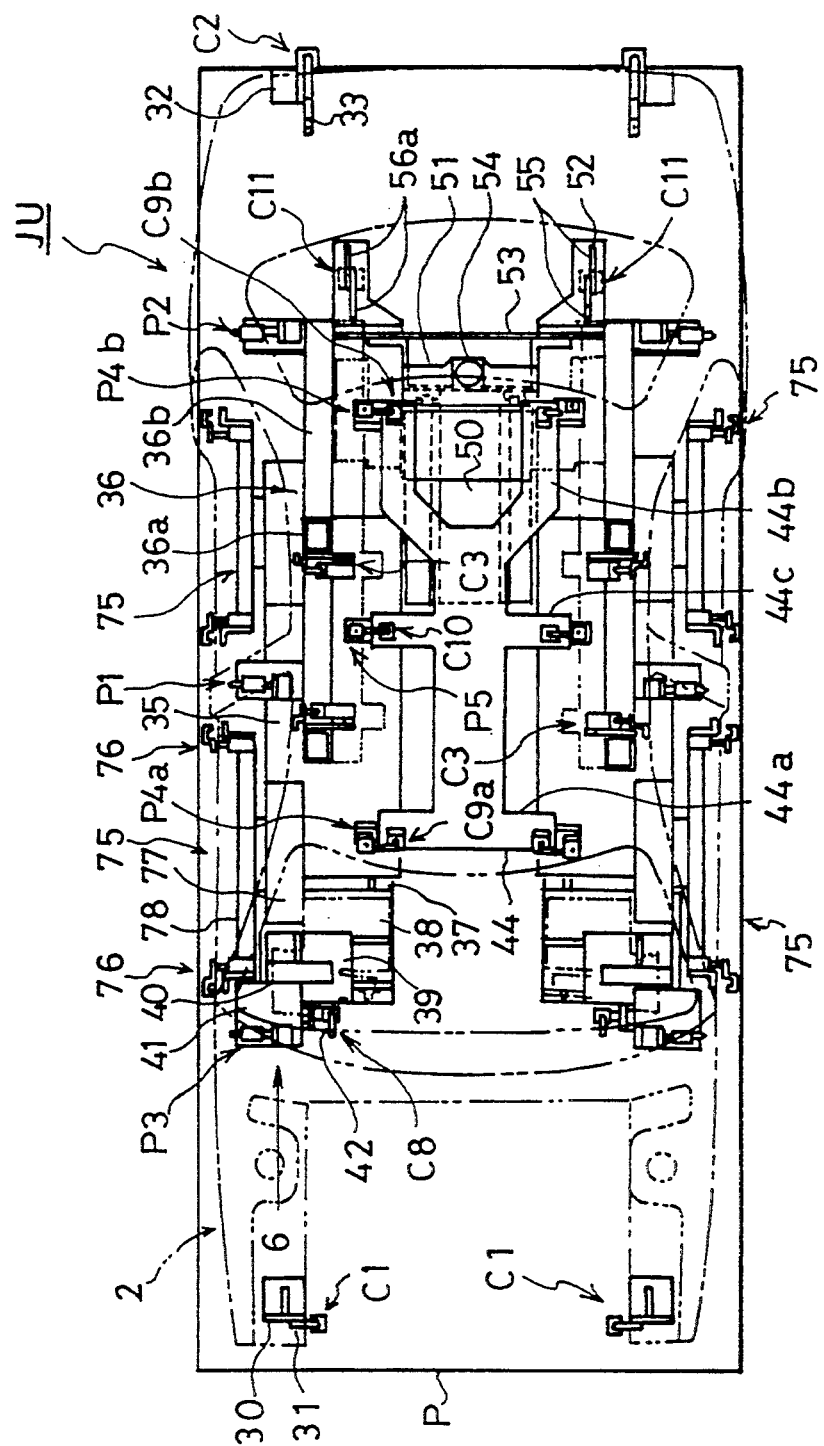
Figure 19:
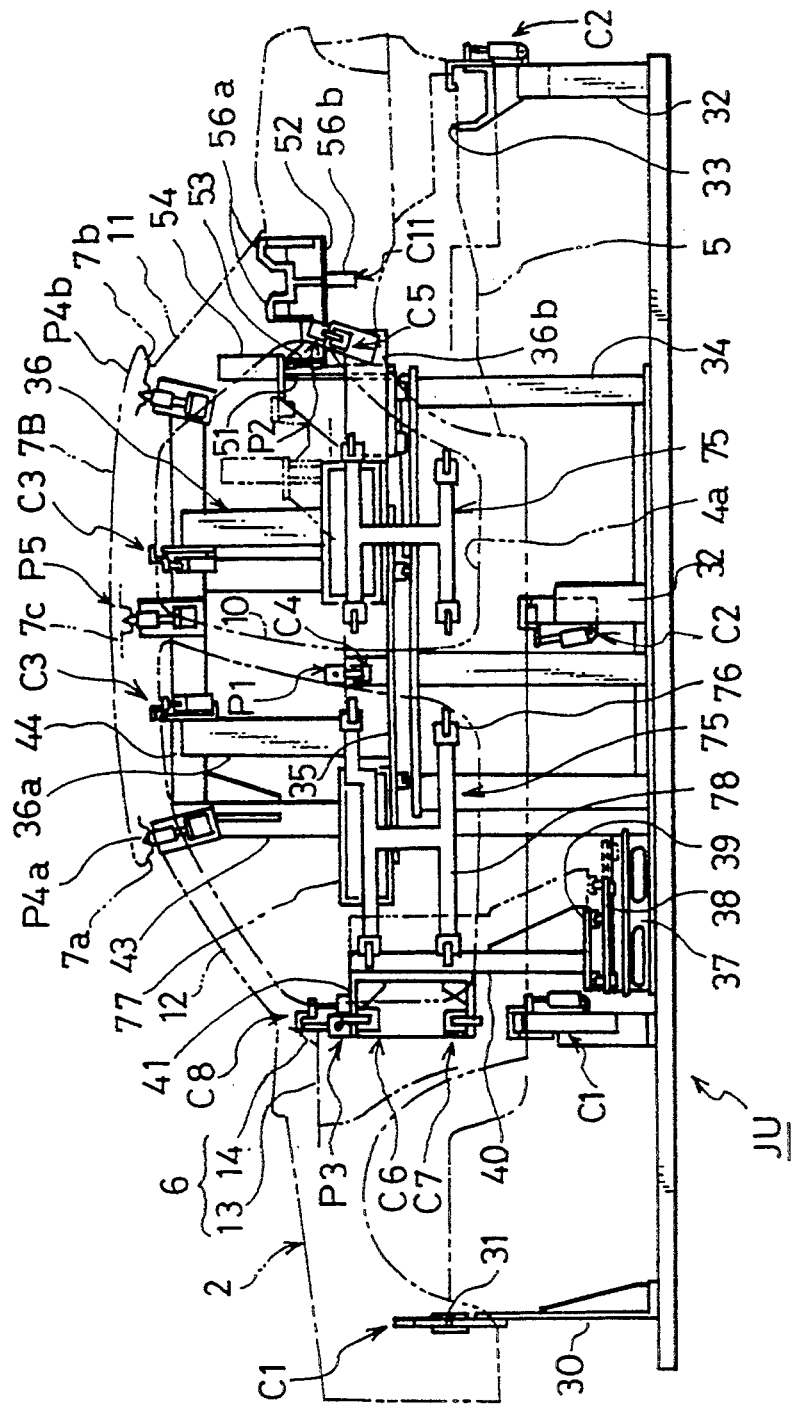

Third Embodiment (FIG. 16)

This third embodiment is a variant of the first embodiment of the present invention as shown in FIG. 1.

The following is a summary of the vehicle body assembly line BL for ready reference to the vehicle body assembly line BL in the first embodiment, in order to summarize the difference from the first embodiment.

First sub-assembly line SL1:
  assembly of the front body 2 with the floor
  assembly member 5
First station S1:
  setting of the assembly of the front body
  2 with the floor assembly member 5 to the
  jig unit JU
Second sub-assembly line SL2:
  assembly of the side inner panels 3
Second station S2:
  setting of the side inner panels 3 to
  the jig unit JU
Third sub-assembly line SL3:
  assembly of the front header 7a and the
  rear header 7b
Third station S3:
  setting the assembly of the front header 7a
  with the rear header 7b to the jig unit JU
  and temporarily welding
Fourth station S4:
  additionally welding (for welding supplementarily
  or permanently)
Fourth sub-assembly line SL4:
  assembly of the side outer panels 4
Fifth station S5:
  setting the assembly of the side outer
  panels 4 to the jig unit JU
Fifth sub-assembly line SL5:
  assembly of the roof outer panel 7B,
  the rear package tray assembly 8 and
  the cowl-dash panel assembly unit 6
Sixth station S6:
  setting of the assembly of the roof
  outer panel 7B, the rear package tray
  assembly 8 and the cowl-dash panel
  assembly unit 6 to the Jig unit JU and
  temporarily welding
Seventh station S7:
  additionally welding (for welding
  supplementarily or permanently)
Sixth sub-assembly line SL6:
  assembly of the lid members, such as
  the bonnet 210, the trunk lid 211,
  the side doors 15 and so on
Eighth station S8:
  temporarily mounting of the assembly of
  the lid members, such as the bonnet
  210, the trunk lid 211, the side
  doors 15 and so on
Ninth station S9:
  removal of the jig unit JU from the vehicle
  body section assembly As shown in FIG. 16, there is additionally disposed a sub-assembly line SL20 for assembling the inner side panel 3 with the side outer panel 4 to form a vehicle body side panel 25 which in turn is fed from the sub-assembly line SL20 to a second station S2. The left-hand and right-hand vehicle body side panels 25 are aligned with the jig unit JU and then fixed thereon.

The jig unit JU is then conveyed through a subassembly line SL21 where a sub-assembly of the front fender 7a with the rear fender 7b and the roof outer panel 7B is mounted to the roof panel 7A. Further, each of the cowl-dash panel assembly unit 6 and the rear package tray assembly 8 is assembled. These vehicle body structuring assemblies 7A, 6 and 8 are then supplied to a third station S21 where they are set to the jig unit JU.

In the third station S21, the assemblies 7A, 6 and 8 mounted to the jig unit JU are temporarily welded with the aid of two welding robots 92 and then further welded supplementarily or permanently with the aid of two welding robots 93 located in a fourth station S22. After the welding has been finished, then the jig unit JU is conveyed to the eighth station S8 (FIG. 1) of the first embodiment.

Fourth Embodiment (FIGS. 17–21)

This fourth embodiment of the present invention is a variant of the Jig unit JU, as shown in FIGS. 2 to 4.

As shown in FIGS. 17 to 20, the jig unit JU is provided with four position adjusting units 175 for aligning the left-hand and right-hand front side doors 15A as well as the left-hand and right-hand rear side doors 15B with the corresponding four door opening sections 4a of the upper vehicle body section 1.

The position adjusting units 175 are mounted on left-hand and right-hand supporting plates 35 disposed inside the upper vehicle body section 1. The left-hand and right-hand position adjusting units 175 have the same structures, and the forward and rearward position adjusting units 175 are identical in structure to each other except for the position in which a clamping unit 176 is mounted. Description will now be made, as an example, of the right-hand forward position adjusting unit 175 for adjusting the position in which the right-hand front side door 15A is mounted to the upper vehicle body section 1.

As shown in FIGS. 17 to 20, a driving mechanism 177 is disposed on a forward upper portion of the righthand supporting plate 35 to move a nearly lying H-shaped supporting frame 178 disposed below a door opening portion 4a in the longitudinal, vertical and transverse directions. A nearly flat J-shaped connecting member 179 is disposed at an end portion of each of arm sections 178a of the supporting frame 178, and each of the connecting member 179 is provided with the clamping unit 176. The clamping unit 176 comprises a clamping lever 176a capable of inserting through an opening portion 15b disposed at four corners of the door inner panel 15a for adjusting or correcting a window regulator and a cylinder 176b for swinging the clamping lever 176a. The door inner panel 15a of the front side door 15A is clamped by four clamping units 176 and supported by the supporting frame 178. The front side door 15A is mounted in an predetermined position of the door opening portion 4a through the supporting frame 178 with the aid of the driving mechanism 177. The driving mechanism 177 is of such a general type that it comprises plural electric motors for adjusting a slight distance of the longitudinal, transverse and vertical directions of the supporting frame 178 and a screw mechanism or a gear mechanism for driving the electric motors.

It is to be noted that the white vehicle body assembly line BL in which the jig unit JU is disposed basically has the same structure as that shown in FIG. 1. The following operations are implemented in the eighth station S8.

Figure 20:
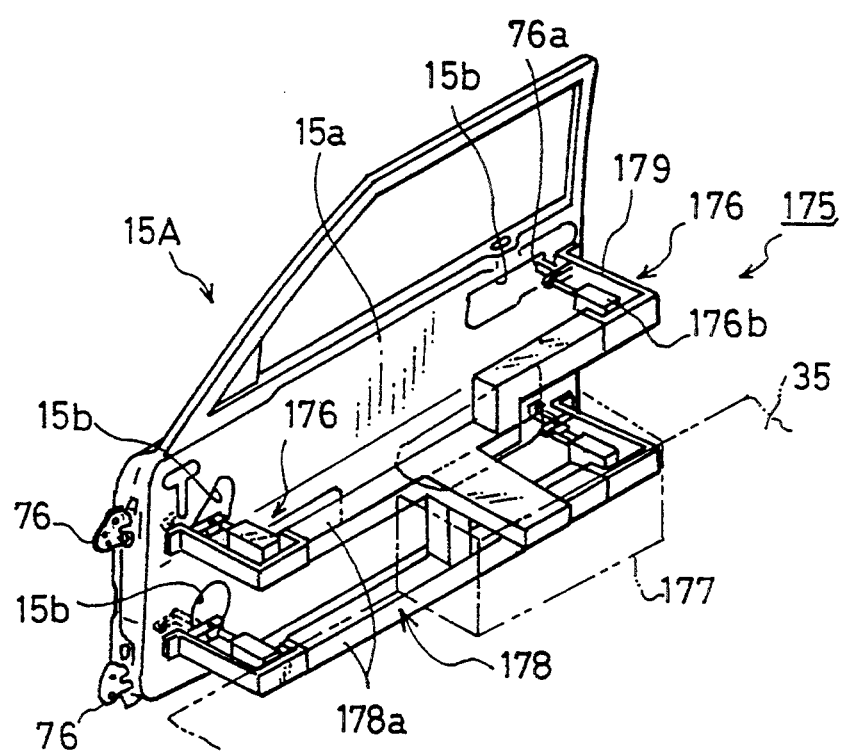
Figure 21:
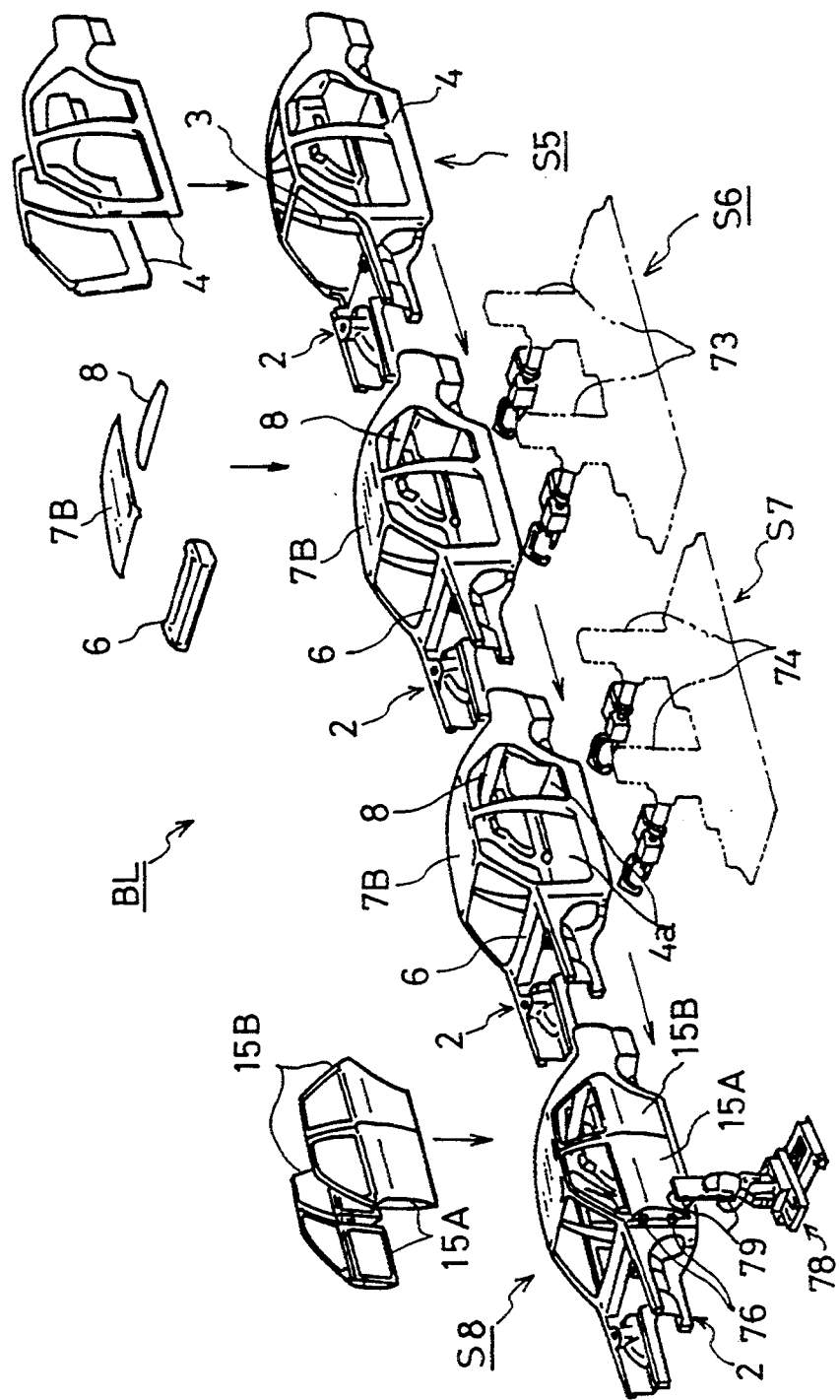

As shown in FIGS. 20 and 21, in the eighth station S8, the left-hand and right-hand front side doors 15A as well as the left-hand and right-hand rear side doors 15B supplied from the sixth sub-assembly line SL6 through a conveying means (not shown) are held at their side door inner panels 15a by the four position adjusting units 175, and the predetermined positions of the door opening portions in which the side doors 15A and 15B are then mounted are adjusted, followed by clamping a pair of the upper and lower hinge members 76 with the side outer panels 4 with the aid of the nut runner 79 of the clamping unit 78 disposed outside the upper vehicle body section 1.

In this fourth embodiment, the front and rear side doors 15A and 15B are held from the inside of the upper vehicle body section 1 and the mounting thereof is adjusted by the position adjusting units 175, so that workability of the position adjusting units 175 and the clamping unit 78 is improved without interference with each other, thereby improving accuracy of mounting the front and rear side doors 15A and 15B.

FIFTH EMBODIMENT (FIG. 22)

The fifth embodiment according to the present invention is a variant of the position adjusting unit 175 according to the fourth embodiment of the present invention.

Figure 22:
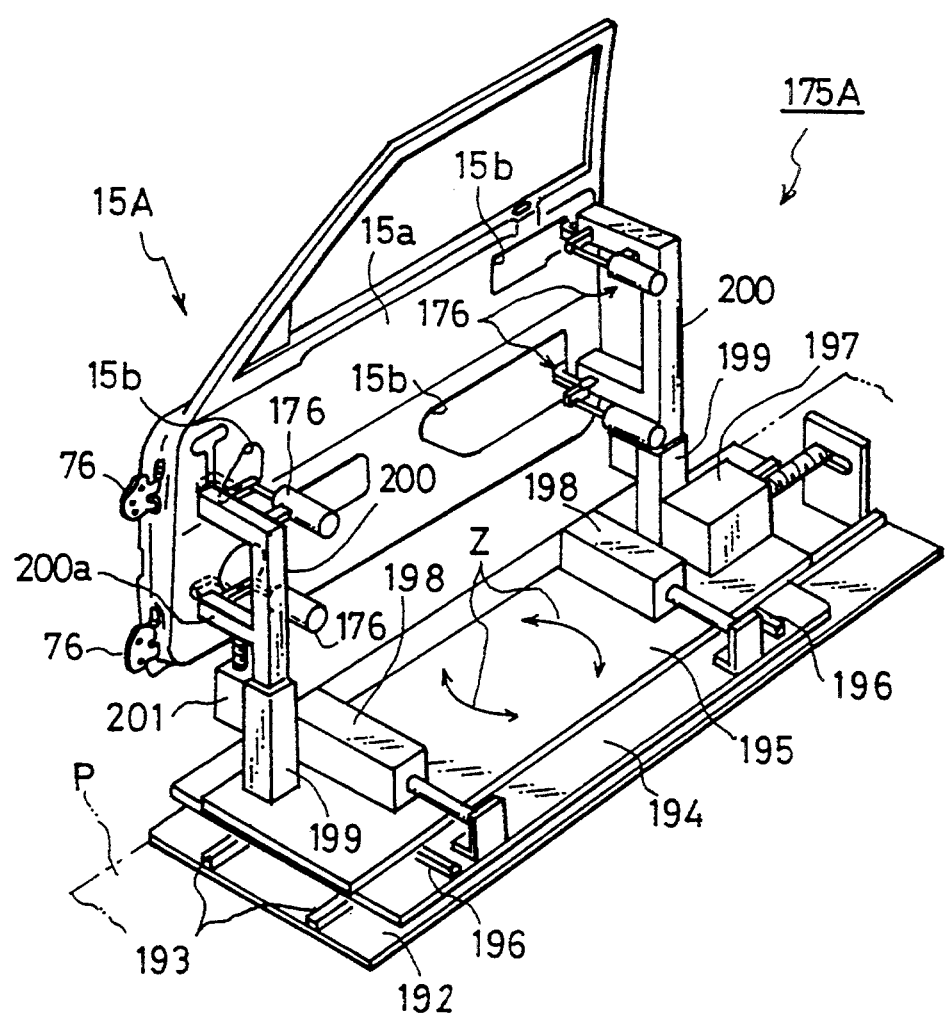
FIG. 22 is directed to a fifth embodiment of the present invention, which shows a position adjusting unit for the side doors disposed in the jig unit.

Description will be made of the position adjusting unit 175A according to the fifth embodiment of the present invention with reference to FIG. 22.

On the pallet P is disposed a base plate 192 which supports a movable plate 194 so as to be movable in the longitudinal direction of the vehicle body through a pair of guide rails 193. To the movable plate 194 is mounted a supporting plate 195 through a pair of guide rails 196 so as to be movable in the transverse direction thereof. The movable plate 194 and the supporting plate 195 are moved in the longitudinal direction relative to the base plate 192 with the aid of the driving mechanism 197 equipped with the electric motors and the screw mechanism. The supporting plate 195 is moved in the transverse direction relative to the movable plate 194 through a pair of cylinders 198 and it pivots at a predetermined angle in the direction as indicated by the arrow Z within a clearance between the guide rail 196 and an engagement member (not shown) of the supporting plate 195.

On the supporting plate 195 are disposed a pair of upstanding forward and rearward supporting sleeves 199 to each of which is mounted a nearly F-shaped movable frame 200 so as to be vertically movable. The positions of both of the movable frames 200 can be adjusted by a driving mechanism 201 in the vertical direction relative to the supporting plate 195, the driving mechanism 201 being disposed on the side surfaces of the supporting sleeve 199 and equipped with the electric motors and the screw mechanism. To each of the end portions of upper and lower arm sections 200a of the movable frame 200 is disposed the clamping unit 176, and the side door 15A or 15B is held by the movable frames 200 through the four clamping units 176. In this state, the side door 15A or 15B is aligned with the door opening portion 4a by adjusting the positions thereof in the longitudinal, transverse and vertical directions and in the direction as indicated by the arrow Z, with the aid of the driving mechanisms 197 and 201 and a pair of the cylinders 198.

In the fourth and fifth embodiments according to the present invention, the members for structuring the vehicle body, such as side inner panels 3, are mounted directly to the Jig unit JU. Hence, the temporary mounting of the body shell is not required so that neither brackets nor stays nor bolts are needed to be mounted to the members for structuring the vehicle body for temporarily mounting, thereby simplifying the structure of the members for structuring the vehicle body and omitting the step for temporarily mounting the vehicle body shell.

In this fifth embodiment as described hereinabove, partial modifications are possible. For example, the side inner panel 3 is assembled in advance with the side outer panel 4 to form a vehicle body side panel assembly, while the front header 7a and the rear header 7b are assembled in advance with the roof outer panel 7B to form a roof panel assembly. The vehicle body side panel assembly and the roof panel assembly are supplied to the vehicle body assembly line BL and the vehicle body side panel assembly is then assembled with the roof panel assembly with the aid of the jig unit JU. It is further to be noted that this assembly method can be applied to the assembly of two-door automotive vehicles. In addition, the lid members such as the bonnets 16, the trunk lids 17 and so on can be mounted to the upper vehicle body section 1 with improved efficiency and with high accuracy by providing the Jig unit JU with a position adjusting unit for adjusting the position of the lid member with its inner panel and reinforcement mounted thereto.

Sixth Embodiment (FIGS. 23–27)

The sixth embodiment according to the present invention is a variant of the jig unit JU as shown in FIG. 2.

As shown in FIGS. 23 to 27, the jig unit JU in this sixth embodiment comprises a pair of left-hand and right-hand welding units 301, a first welding robot 302 and a second welding robot 303.

The left-hand and right-hand welding units 301 are mounted each to a rearward top end of the corresponding supporting frame 41 in such a fixed manner or in such a manner that the position of the welding unit 301 can be adjusted. Further, each of the left-hand and right-hand welding units 301 is so arranged as to temporarily and supplementarily or permanently weld a portion in the vicinity of a lower end of a front pillar of the side outer panel 4 with the aid of a welding head 301a.

The first welding robot 302 is a multi-joint robot which is disposed upstanding in a fixed manner on the pallet P in front of and close to the forward upstanding column 43. The first welding robot 302 is so arranged as to temporarily and supplementarily or permanently weld the portion of the side outer panel 4 positioned at an outer peripheral portion of the front window opening section from the inside. On the other hand, the second welding robot 303 is a multi-joint robot which is fixed in the position located between a two-branch rearward portion of the supporting frame 44. The second welding robot 303 is so arranged as to temporarily and permanently weld the portion of the side outer panel 4 positioned at an outer peripheral portion of the rear window opening section from the inside.

The vehicle body assembly line BL with the jig unit JU disposed therein basically has the same configuration as that as shown in FIG. 1, and the following operations are carried out in the sixth station S6 and the seventh station S7.

In the sixth station S6, the roof outer panel 7B, the rear packing tray assembly 8 and the cowl-dash panel assembly unit 6 are first set to the jig unit JU.

Thereafter, the side outer panel 4 is temporarily welded to the side inner panel 3 with the aid of two welding robots 73 disposed in the sixth station as well as two welding units 101 disposed to the jig unit JU and two welding robots 302 and 303 disposed thereto. The cow-dash panel assembly unit 6 is temporarily welded to the side inner panel 3 and the front body section 2. Further, the roof outer panel 7B is temporarily welded to the front and rear headers 7a and 7b as well as to the side outer panel 4. In addition, the rear packing tray assembly 8 is temporarily welded to the side inner panel 3 and the rear floor assembly member 5.

In the seventh station S7, the temporarily welded portions are supplementarily or permanently welded with the aid of the corresponding welding robots 74, 302 and 303. As shown in FIG. 8, the two welding robots 74 are disposed in the seventh station S7. The two welding robots 302 and 303 are mounted to the jig unit JU.

In this sixth embodiment according to the present invention, the front vehicle body section 2 and the rear floor assembly member 5 are aligned and fixed to the jig unit JU to which in turn are supplied the side inner panel 3, the front header 7a and the rear header 7b. The inner members of these elements are aligned and fixed through the jig unit JU, followed by the connection of the left-hand and right-hand side inner panels 3 to the front vehicle body section 2, the rear floor assembly member 5, the front header 7a and the rear header 7b. This arrangement can implement the assembly with high accuracy and with improved efficiency. It is further to be noted that a number of welding holes can be omitted because of the welding of the inner members.

After the inner members have been welded and connected in the manner as described hereinabove, the side outer panel 4 and the roof outer panel 7B are supplied. In other words, the side outer panel 4 is aligned with the side inner panel 3 which has already been aligned and connected with high accuracy. Further, the roof outer panel 7B is aligned with and connected to the roof inner members 7a and 7b which have already been aligned and connected with high accuracy. Hence, these outer members can be aligned with the inner members with high accuracy and mounted to the inner members with high efficiency.

By employing the welding units 301 and the welding robots 302 and 303, which have been disposed to the jig unit JU, the temporary and supplementary or permanently welding to the side outer panels 4 can be implemented even from the inside of the upper vehicle body section 1, so that the welding operations can be carried out with high efficiency and the number of welding stations can be reduced.

Seventh Embodiment (FIGS. 28–34)

Figure 23:
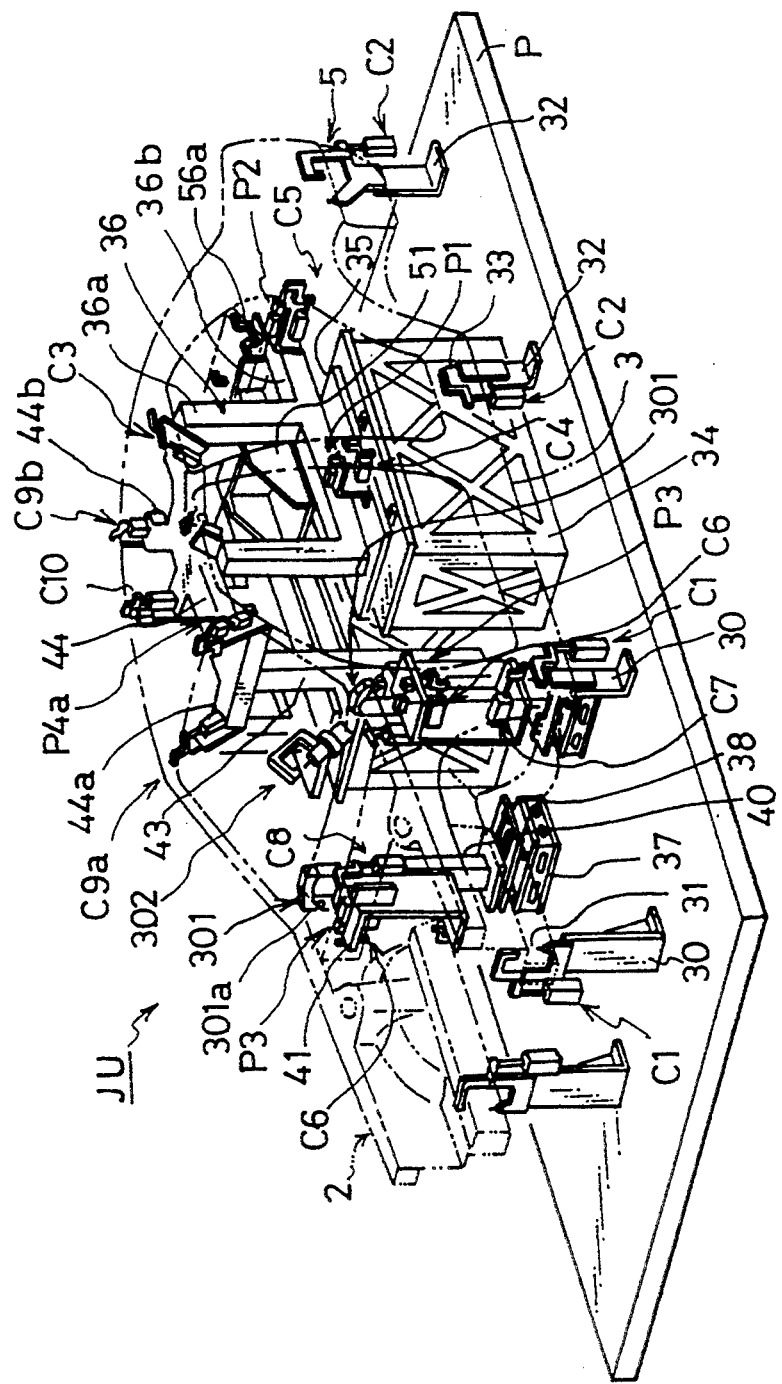
Figure 24:
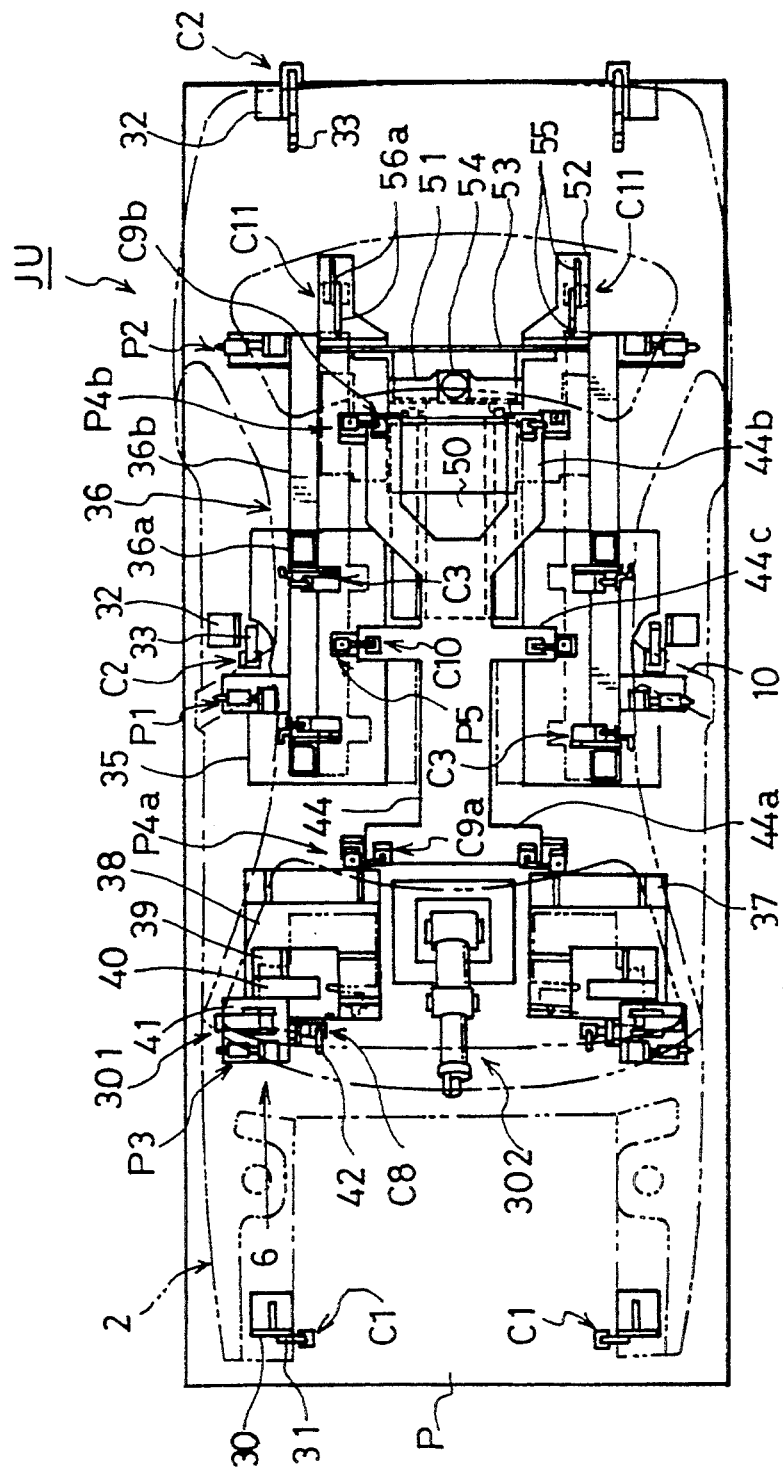
Figure 25:
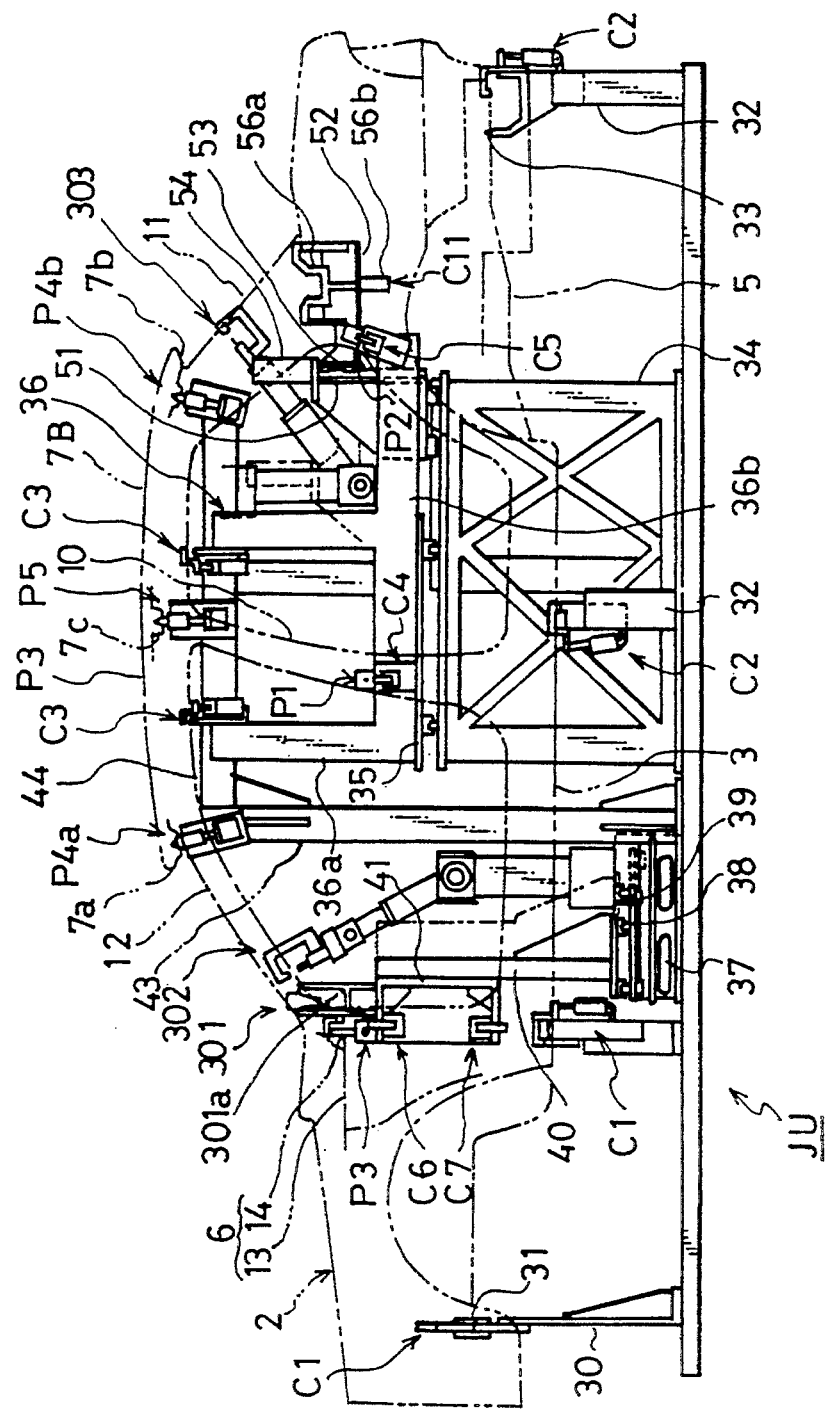
Figure 26:
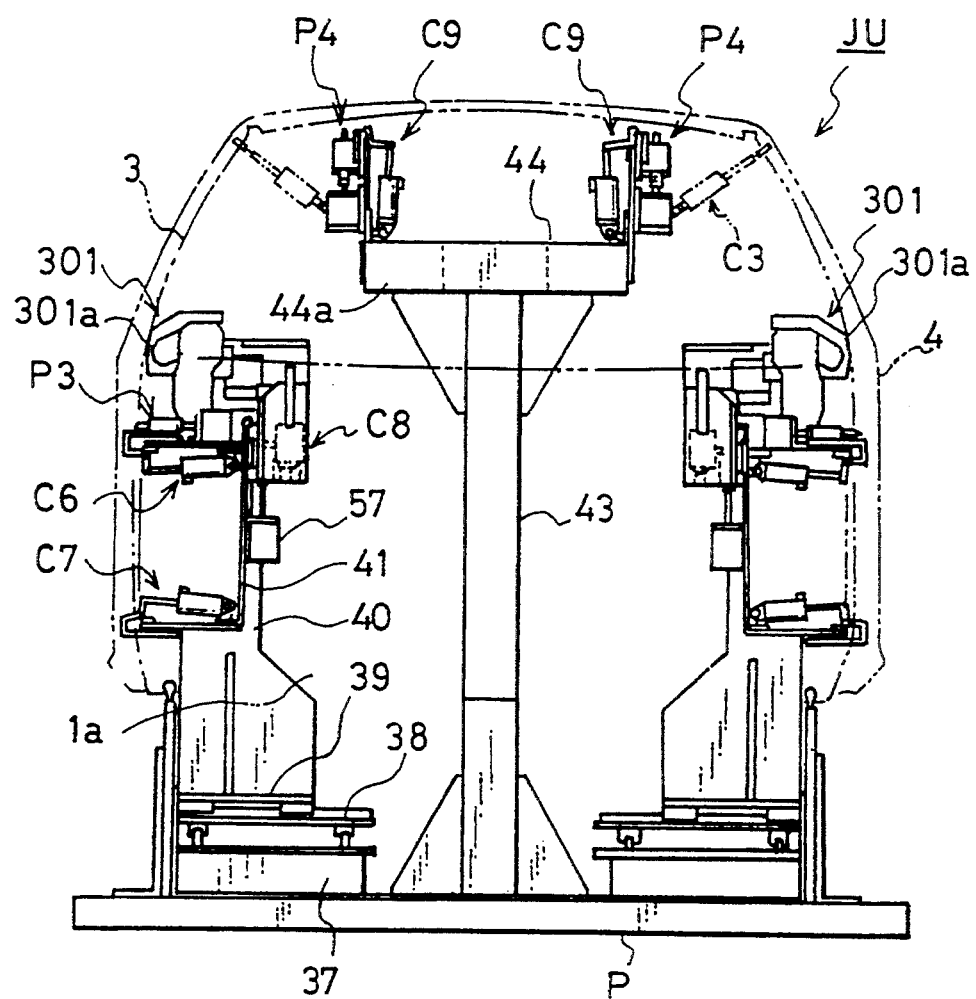
Figure 27:
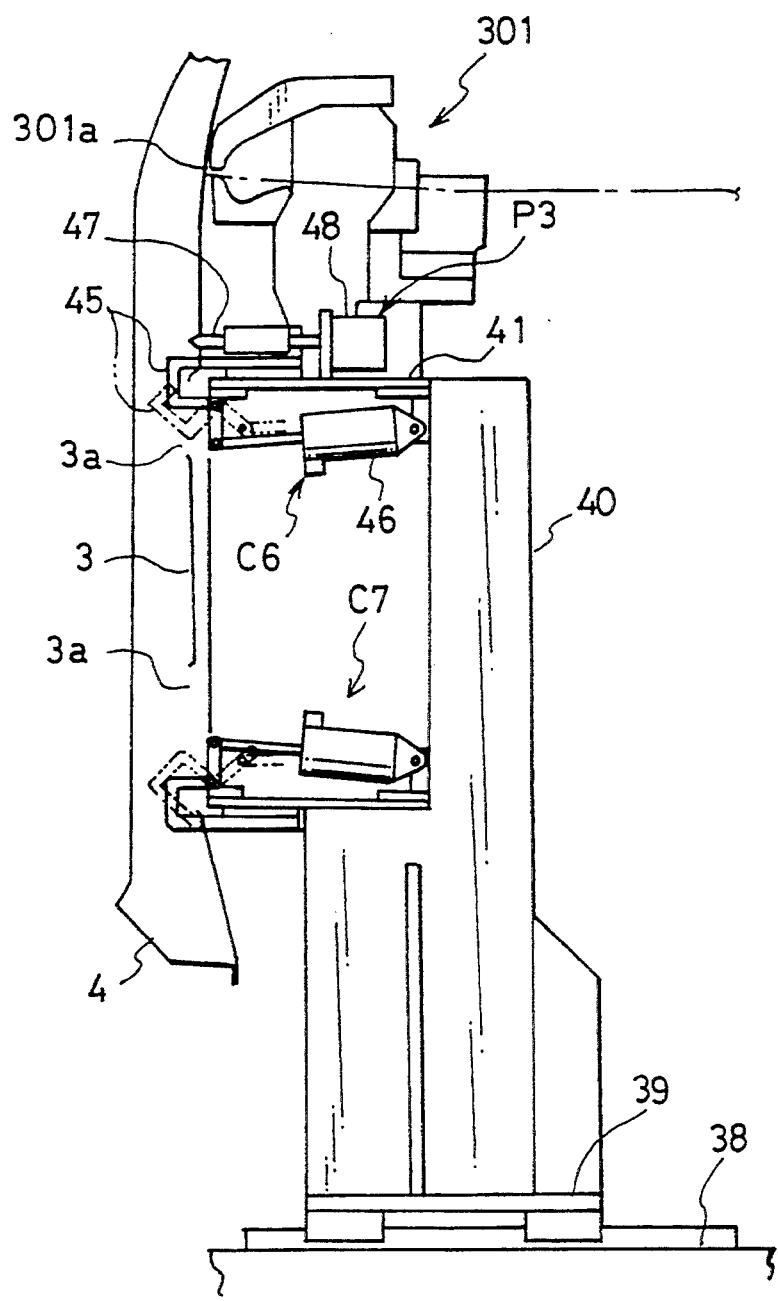

The seventh embodiment according to the present invention is a variant of the vehicle body assembly line BL. The vehicle body assembly line BL of the seventh embodiment has eight stations S1 to S8, inclusive, and the jig unit JU disposed in this vehicle body assembly line BL has the same structure as employed in the sixth embodiment as shown in FIG. 23. To the jig unit JU are mounted the welding unit 301 as well as the welding robots 302 and 303.

Description will now be made of the vehicle body assembly line BL with reference to FIG. 28 and the like.

The front vehicle body section 2 comprises left-hand and right-hand front frames, left-hand and right-hand wheel aprons, a lower dash panel, a lower dash panel member (a second cross-member) and so on. And the front vehicle body section 2 is assembled in the second sub-assembly line SL2.

It is to be noted that, in this seventh embodiment, a shroud panel disposed at a front end portion of the vehicle body is likewise sub-assembled and mounted to the upper vehicle body section 1 after an internal combustion engine has been mounted.

The rear floor assembly member 5 comprises a rear floor panel, left-hand and right-hand rear flames, a fourth cross-member, a rear cross-member, a trunk floor, a rear end panel and so on, and the rear floor assembly member 5 is assembled in the first sub-assembly line SL1.

The left-hand and right-hand side inner panels 3 are sub-assembled each with an inner panel body, an inner roof rail, an impact bracket, a wheel housing, a suspension reinforcement member and so on. On the other hand, the left-hand and right-hand side outer panels 4 are sub-assembled each with an outer panel body, a front hinge reinforcement member, a rear hinge reinforcement member, a center pillar reinforcement member, a rear striker reinforcement member, a corner plate and so on. In addition, the left-hand and right-hand vehicle body side panels 4A are sub-assembled each with the side inner panel 3 and the side outer panel 4 in the third sub-assembly line SL2.

Each of the front header 7a and the rear header 7b as the inner roof member of the roof panel 7A is subassembled with a header inner panel, a header outer panel and so on. The roof outer panel 7B is subassembled with the roof outer panel body, a roof bough 7c and so on. The roof panel 7A is sub-assembled with the roof outer panel 7B, the front header 7a, the rear header 7b and so on in the third sub-assembly line SL3.

The rear packing tray assembly member 8 comprises a package tray, a bracket and so on, and the cow-dash panel assembly unit 6 comprises a cowl panel, a dash panel and so on. The rear packing tray assembly member 8 is sub-assembled with the cow-dash panel assembly member 6 in the third sub-assembly line SL3. The main floor section 20 is sub-assembled in the fourth sub-assembly line SL4.

Each of the bonnet 16 and the trunk lid 17, as the lid members, is sub-assembled in the fifth subassembly line SL5. Four side doors 15 are sub-assembled each with a door inner panel, a door outer panel, a sash, a window glass panel, a window regulator and so on in the fifth sub-assembly line SL5.

First Station S1

Figure 29:
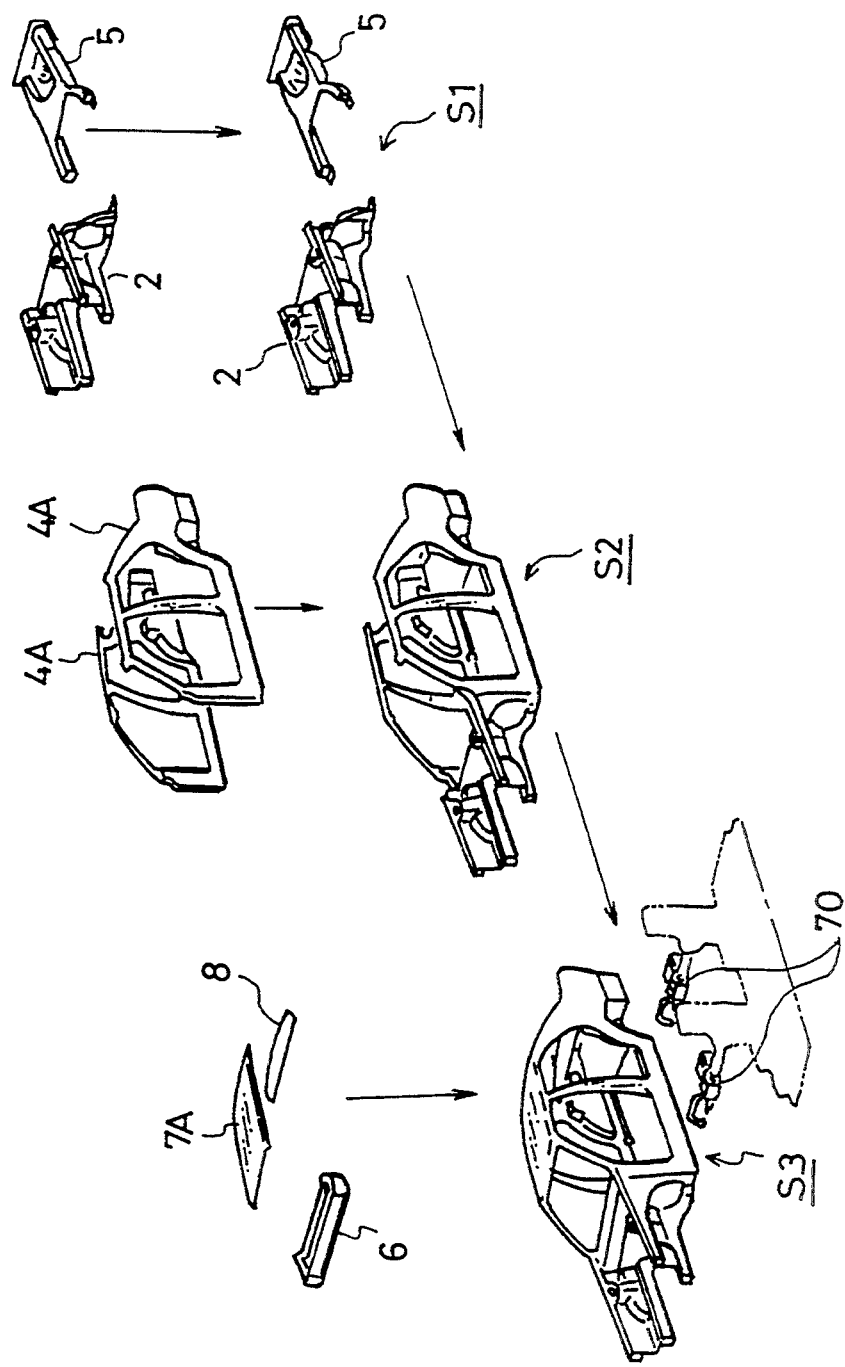

As shown in FIG. 29, each of the front vehicle body section 2 and the rear floor assembly member 5 is aligned with the jig unit JU and then clamped by the corresponding clamping units in the first station S1 in substantially the same manner as in the first embodiment according to the present invention. The front vehicle body section 2 and the rear floor assembly member 5 are supplied from the first sub-assembly line SL1.

Second Station S2

As shown in FIG. 29, the Jig unit JU transferred from the first station S1 is aligned in the second station S2, and the left-hand and right-hand vehicle body side panels 4A supplied from the second sub-assembly line SL2 are aligned with the jig unit JU with the aid of the aligning units P1, P2 and P3 as well as clamped at their side inner panels 3 by the corresponding clamping units C3 to C7, inclusive.

As means for transferring the vehicle body side panels 4A from the second sub-assembly line SL2 to the second station S2, there may be employed the transferring unit 60 as shown in FIG. 10.

Third Station S3

Figure 28:
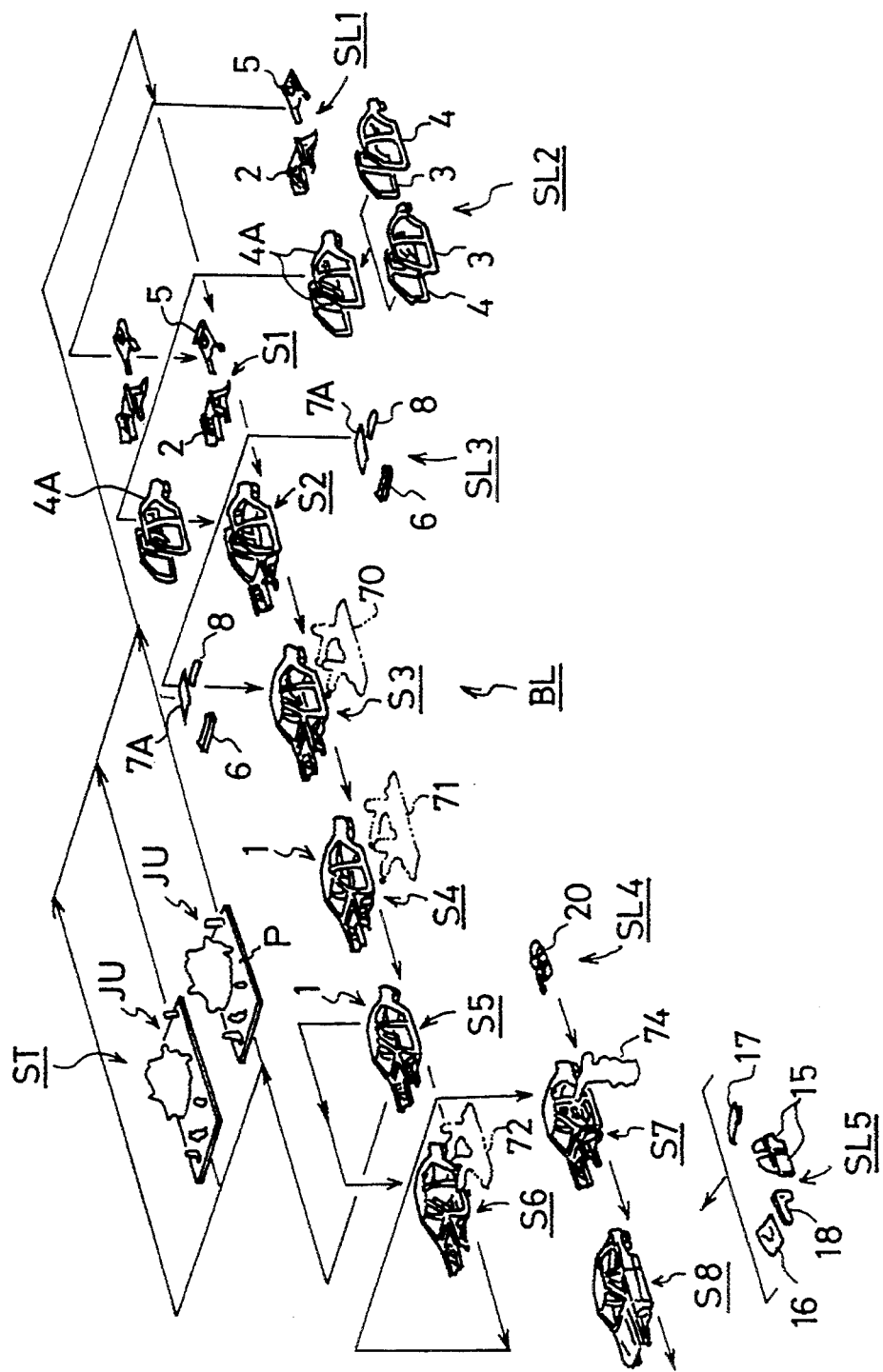

As shown in FIG. 28, the roof panel 7A is supplied from the third sub-assembly line SL3 to the third station S3 and set to the jig unit JU in the manner as will be described hereinafter. The front header 7a and the rear header 7b of the roof panel 7A are aligned with the jig unit JU with the aid of the aligning units P4a and P4b and clamped by the clamping units C9a and C9b. The roof outer panel 7B is aligned with the jig unit JU with the aid of the aligning unit P5 and clamped by the clamping unit C10.

Thereafter, the left-hand and right-hand side end portions of the front header 7a are temporarily welded to the left-hand and right-hand side inner panels 3, respectively, with the aid of the welding robot 302. Likewise, the left-hand and right-hand side end portions of the rear header 7b are temporarily welded to the left-hand and right-hand side inner panels 3, respectively, with the aid of the welding robot 303.

Further, as shown in FIG. 29, the left-hand and right-hand side inner panels 3 are temporarily welded to the front vehicle body section 2 and the rear floor assembly member 5 with the aid of the two welding robots 70 disposed in the third station S3. Likewise, the roof outer panels 7B are temporarily welded to the left-hand and right-hand side outer panels 4.

To the third station S3, the cow-dash panel assembly unit 6 and the rear packing tray assembly member 8 are supplied from the third sub-assembly line SL3 and set to the Jig unit JU in the following way. In other words, the cow-dash assembly unit 6 is aligned with the jig unit JU through the aligning pin 42 and clamped by the clamping unit C8. On the other hand, the rear packing tray assembly member 8 is aligned with the jig unit JU with the aid of the aligning pin 55 and clamped by the clamping unit C11.

After the cow-dash assembly unit 6 and the rear package tray assembly member 8 have been clamped, the cow-dash assembly unit 6 is temporarily welded to the side inner panel 3 and the front vehicle body section 2 with the aid of the welding robot 70 disposed outside the vehicle body section and the welding robot 302 disposed inside the vehicle body section, and the rear package tray assembly member 8 is temporarily welded to the side inner panel 3 and the rear floor assembly member 5 with the aid of the welding robot 70 disposed outside the vehicle body section and the welding robot 303 disposed inside the vehicle body section. The portion of the side inner panel 3 located in the vicinity of a lower end portion of the front pillar 12 is temporarily welded with the welding unit 301 and the cow-dash assembly unit 6.

As the temporary welding can be implemented from the inside of the upper vehicle body section 1 with the aid of the welding robots 302 and 303 as well as the welding unit 301, which are disposed on the jig unit JU, the welding operations can be carried out with high efficiency and the number of the stations for welding can be reduced.

Fourth Station S4

Figure 30:
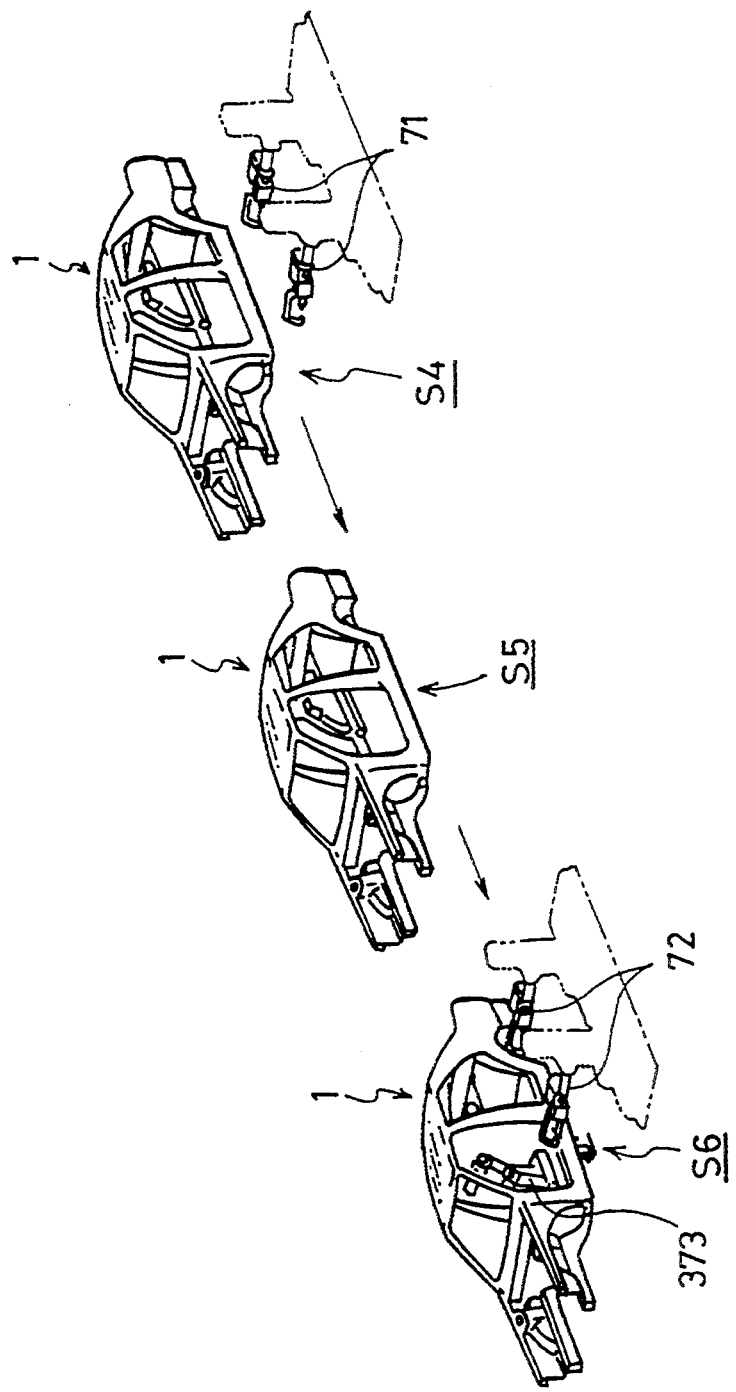

In the fourth station S4, two welding robots 71 are disposed as shown in FIG. 30, and they are so arranged as to supplementarily or permanently weld the connections of the front vehicle body section 2, the rear floor assembly member 5, the left-hand and right-hand vehicle body side panels 4A, and the roof panel 7A.

Fifth Station S5

Figure 32:
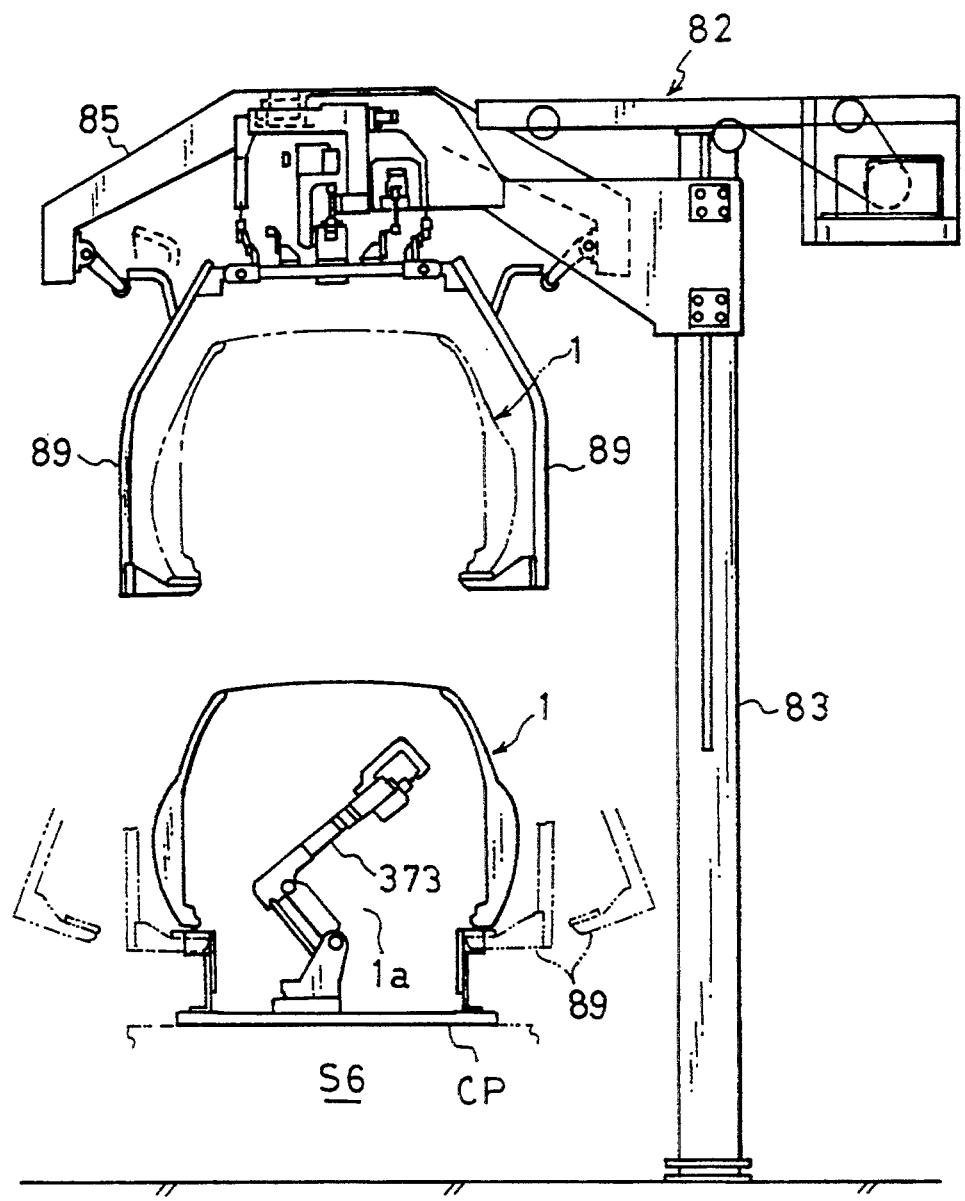

In the fifth station S5, the upper vehicle body section 1 is lifted up by the lifting-lowering unit 82 (FIG. 12) and the Jig unit JU is evacuated from the upper vehicle body section 1 toward below. The jig unit JU is transferred to the jigs stock station ST and the upper vehicle body section 1 is transferred and loaded to the pallet CP of the sixth station S6, as shown in FIG. 32. To the pallet CP is .disposed a welding robot 373 located inside the upper vehicle body section 1.

Sixth Station S6

Figure 33:
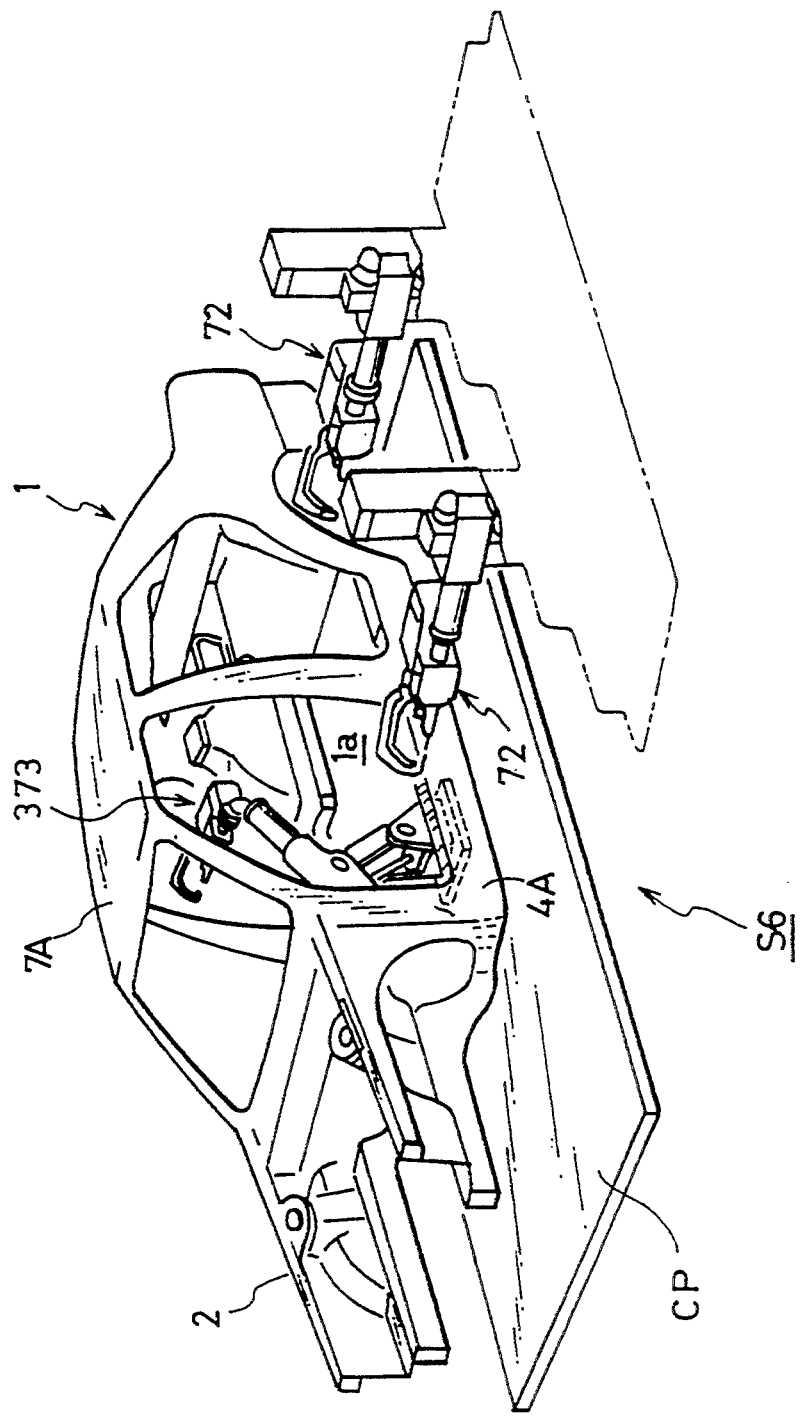
Figure 34:
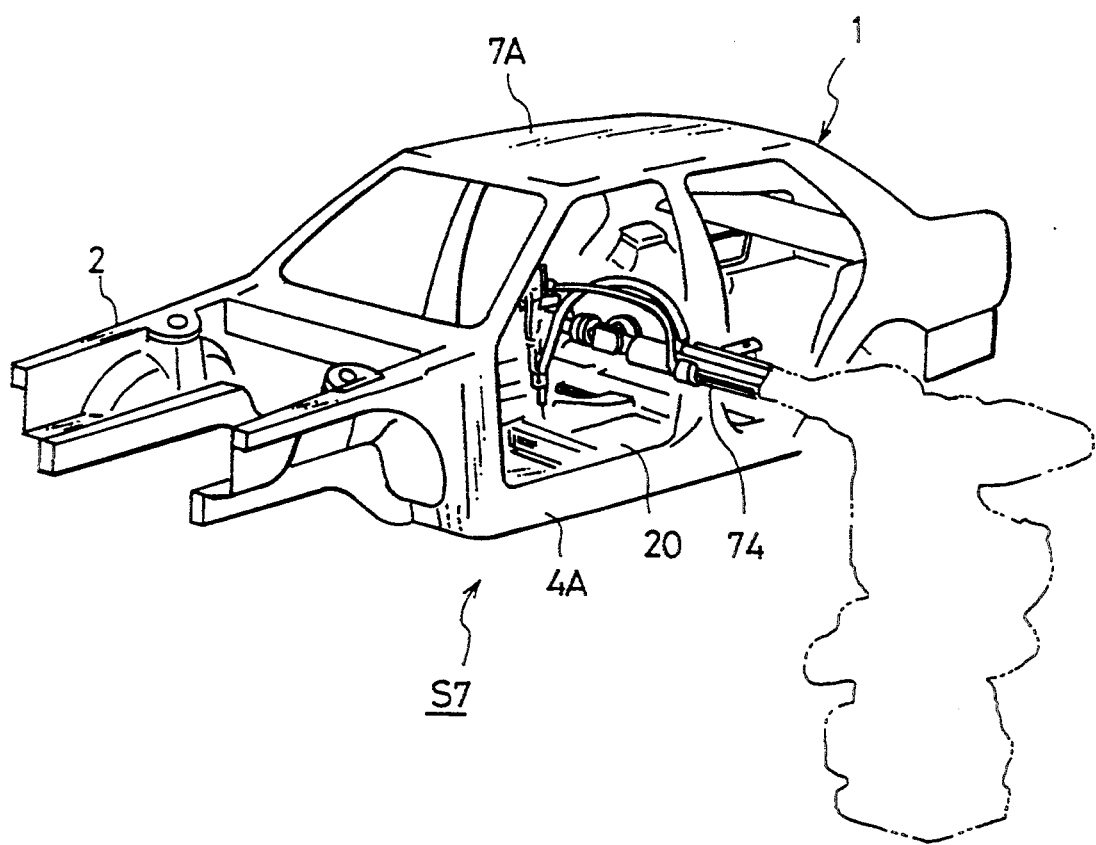

In the sixth station S6, two welding robots 72 are disposed outside the upper vehicle body section 1, as shown in FIG. 33. Supplementary or permanent welding is further carried out by the welding robots 72 disposed outside the upper vehicle body section 1 and a welding robot 373 disposed inside the upper vehicle body section 1. Hence, the welding operations can be carried out with high efficiency and the number of stations for welding can be reduced.

Seventh Station S7

Figure 31:
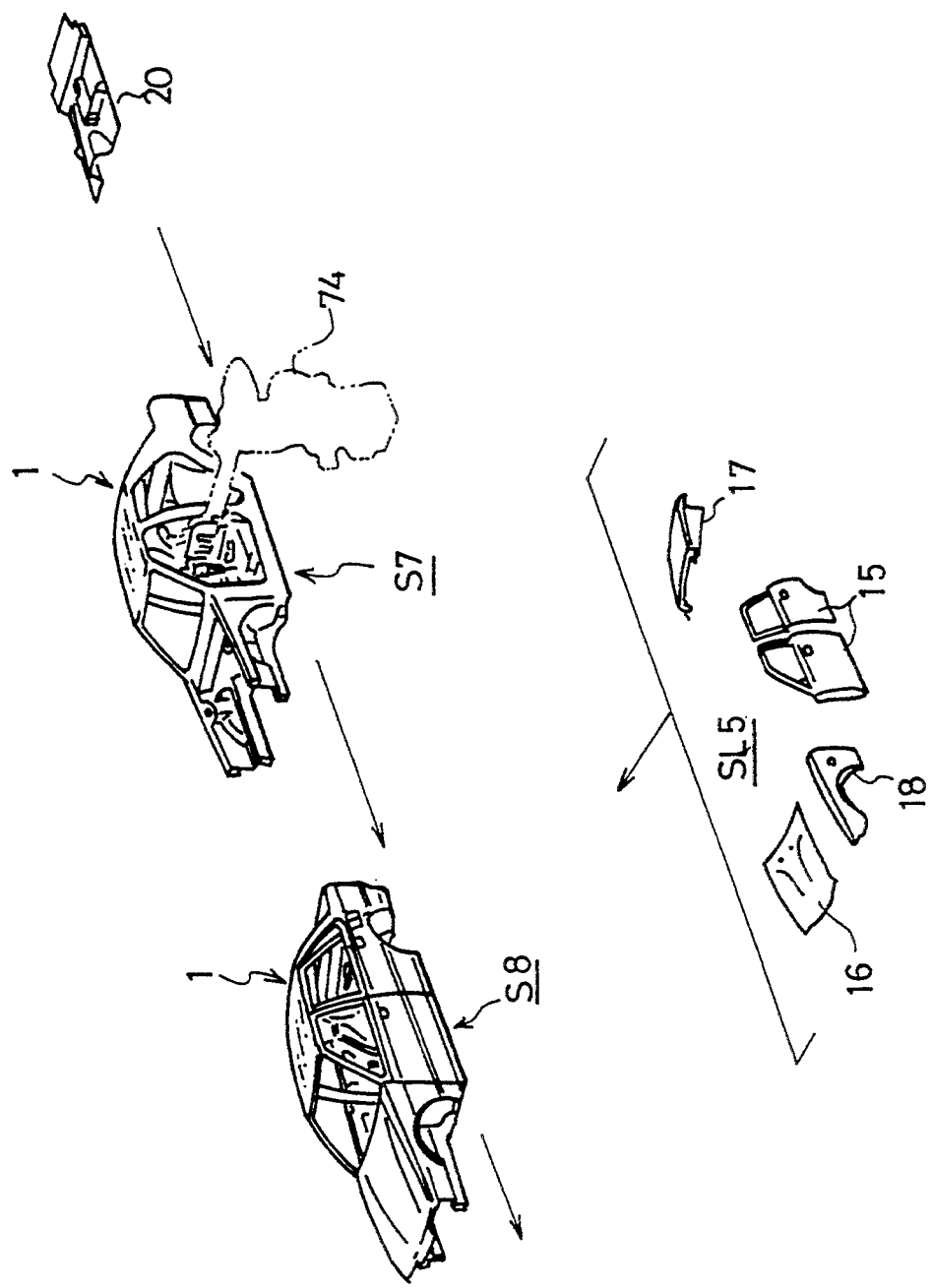

As shown in FIG. 31, the upper vehicle body section 1 is conveyed and transferred with the aid of a lifting-lowering unit, having substantially the same structure as the lifting-lowering unit 82, from the sixth station S6 to the seventh station S7 extending in straight line from the first-sixth stations S1–S6. On the other hand, the main floor member 20 is set on a predetermined jig disposed in the seventh station S7. The upper vehicle body section 1 is supplied to the seventh station S7 from the sixth station S6 and then lowered from above up to the main floor member 20 set on the jig. Then, the upper vehicle body section 1 is aligned with the main floor member 20 which in turn is welded temporarily and then permanently to the upper vehicle body section 1 through the welding robot 74 disposed outside the upper vehicle body section, as shown specifically in FIG. 34, thereby forming the vehicle body section 1 with the main floor member 20 mounted thereto. This vehicle body section 1 corresponds to the vehicle body shell.

Eighth Station S8

The vehicle body shell is transferred from the seventh station S7 to the eighth station S8. The left-hand and right-hand side doors 15, the bonnet 16, the front fenders 18 and the trunk lid 17 are supplied from the fifth sub-assembly line SLS. The left-hand and right-hand side doors 15 are mounted to side opening portions of the vehicle body shell with the aid of a mounting robot, although not shown. The bonnet 16 and the front fenders 18 are likewise mounted to the front vehicle body section 2, and the trunk lid 17 is likewise mounted to the rear vehicle body section. The shroud panel is then mounted after the internal combustion engine has been mounted.

In this embodiment according to the present invention, the jig unit JU is provided with a pair of the welding units 301 and a pair of forward and rearward welding robots 302 and 303, so that part of the temporary welding in mounting the vehicle body side panels 4A and the roof panel 7A is implemented from the inside of the upper vehicle body section 1. It is further to be noted that the welding robots 302 and 303 may be so arranged as to implement the supplementarily or permanently welding, in addition to the temporary welding.

It is to be understood that the present invention is not construed as being restricted in any respects to those described hereinabove, which are described merely for illustrative purposes, and as encompassing all changes, variations, and modifications within the spirit and scope of the present invention.

What is claimed is:

1. A method for the assembly of an automotive vehicle, comprising:
   a first step for setting a vehicle body side panel and a roof panel to a jig unit having a first holding mechanism for holding the vehicle body side panel from an inner position with respect to the vehicle body side panel after the vehicle body side panel has been aligned on the basis of an inner panel of the vehicle body side panel and a second holding mechanism for holding the roof panel from an inner position with respect to the vehicle body side panel after the roof panel has been aligned on the basis of an inner member of the roof panel;
   a second step for connecting the vehicle body side panel to the roof panel, each being set to the jig unit, to form a vehicle body assembly; and
   a third step for evacuating the jig unit downward from an inner position with respect to the vehicle body assembly.

2. A method as claimed in claim 1, wherein:
   the roof panel is composed of a roof outer panel, a front header disposed on the front side of the roof outer panel and a rear header disposed on the rear side thereof; and
   the second holding mechanism aligns the roof panel on the basis of the front header and the rear header.

3. A method as claimed in claim 1, wherein:
   the first holding mechanism is disposed so as to be movable between a holding position in which vehicle body side panels are held and an evacuating position in which the first holding mechanism is evacuated from the vehicle body side without causing interference with the vehicle body side panels;
   the second holding mechanism is disposed so as to be movable between a holding position in which the roof panel is held and an evacuating position in which the second holding mechanism is evacuated from the roof panel without causing interference with the roof panel;
   the first holding mechanism assumes the holding position in the first and second steps and the evacuating position in the third step; and
   the second holding mechanism assumes the holding position in the first and second steps and the evacuating position in the third step.

4. A method as claimed in claim 1, wherein:
   the jig unit further comprises a welding mechanism disposed so as to be located inside the vehicle body side panels; and
   the vehicle body side panels are welded to the roof panel in the second step with the aid of the welding mechanism.

5. A method as claimed in claim 4, wherein the welding mechanism welds the vehicle body side panels temporarily to the roof panel.

6. A method as claimed in claim 4, wherein the welding mechanism welds the vehicle body side panels temporarily and thereafter supplementarily or permanently to the roof panel.

7. A method as claimed in claim 6, wherein:
the vehicle body side panels are welded temporarily to the roof panel in one station;
the vehicle body side panels are welded supplementarily or permanently to the roof panel in another station; and
the jig units are transferred one after another to the one station and to the another station.

8. A method as claimed in claim 4, wherein:
a welding robot is disposed outside the vehicle body side panel in a station where the second step is carried out; and
the vehicle body side panels are welded to the roof panel with the aid of the welding mechanism and the welding robot in the station where the second step is carried out.

9. A method as claimed in claim 1, wherein:
the second step is carried out in a plurality of stations where the Jig units are transferred one after another;
a welding robot is disposed outside the vehicle body side panels in each of the plurality of the stations;
the vehicle body side panels are temporarily welded to the roof panel with the aid of the welding robot in a front stage of the plurality of the stations; and
the vehicle body side panels are then welded supplementarily or permanently to the roof panel with the aid of the welding robot in a rear stage thereof.

10. A method as claimed in claim 1, further comprising:
a step for setting a cowl dash panel assembly unit to the jig unit which further comprises a third holding mechanism for holding the cowl-dash panel assembly unit after having been aligned; and
a step for connecting the cowl dash panel assembly set to the jig unit to the vehicle body side panels;
wherein each of the steps is carried out prior to the third step.

11. A method as claimed in claim 10, further comprising:
a step for setting a front vehicle body section to the jig unit which further comprises a fourth holding mechanism for holding the front vehicle body section after having been aligned; and
a step for setting the front vehicle body section set to the Jig unit to the vehicle body side panels and the cow-dash panel assembly unit;
wherein each of the steps is carried out prior to the third step.

12. A method as claimed in claim 11, wherein the front vehicle body section comprises left-hand and right-hand front frames, left-hand and right-hand wheel aprons, and a dash panel.

13. A method as claimed in claim 11, further comprising a step for mounting a bonnet to the vehicle body assembly connected to the front vehicle body section prior to the third step.

14. A method as claimed in claim 1, further comprising:
a step for setting a rear floor assembly to the jig unit which further comprises a fifth holding mechanism for holding the rear floor assembly after having been aligned; and
a step for connecting the rear floor assembly set to the jig unit to the vehicle body side panels;
wherein each of the steps is carried out prior to the third step.

15. A method as claimed in claim 14, wherein the rear floor assembly comprises a rear floor panel, left-hand and right-hand rear frames, a rear cross member and a rear end panel.

16. A method as claimed in claim 1, further comprising a step for connecting a main floor panel with a member including a seat mounted thereto to the vehicle body assembly, subsequent to the third step.

17. A method as claimed in claim 1, wherein:
the first, second and third steps are carried out in a plurality of stations; and
the jig units are transferred one after another to each of the plurality of the stations.

18. A method as claimed in claim 17, wherein:
a sub-assembly line is merged with a station where the first step is carried out; and
the vehicle body side panel or the roof panel is sub-assembled in the sub-assembly line.

19. A method as claimed in claim 1, further comprising a step for mounting a side door to the vehicle body assembly between the second step and the third step.

20. A method as claimed in claim 19, wherein:
a mounting robot is disposed in a station where the step for mounting the side door to the vehicle body assembly is carried out;
the side door is mounted to the vehicle body assembly with the aid of the mounting robot; and
the position in which the side door is mounted to the vehicle body assembly is adjusted with the aid of the mounting robot.

21. A method as claimed in claim 19, wherein:
an adjusting mechanism for adjusting the position of mounting the side door is disposed so as to be located inside the side door; and
the position of mounting the side door mounted to the vehicle body assembly is adjusted on the basis of an inner panel of the side door with the aid of the adjusting mechanism.

22. A method as claimed in claim 1, further comprising:
a step for setting a rear package tray assembly to the Jig unit which further comprises a sixth holding mechanism for holding the rear package tray assembly after having been aligned; and
a step for connecting the rear package tray assembly set to the jig unit to the vehicle body side panels;
wherein each of the steps is carried out prior to the third step.

23. A method as claimed in claim 15, further comprising a step for mounting a trunk lid to a vehicle body assembly to which the rear floor assembly and the rear package tray assembly are connected, prior to the third step.

24. A method for the assembly of an automotive vehicle body, comprising:
a first step for setting a vehicle body side inner panel and a roof panel to a jig unit having a first holding mechanism for holding the vehicle body side inner panel from an inner position with respect to the vehicle body side inner panel after having been aligned and a second holding mechanism for holding the roof panel from an inner position with respect to the vehicle body side inner panel after the roof panel has been aligned on the basis of an inner member of the roof panel;

a second step for connecting the vehicle body side inner panel to the roof panel, each being set to the jig unit;

a third step for aligning a vehicle body side outer panel with the vehicle body side inner panel after the second step;

a fourth step for connecting the vehicle body side outer panel to the vehicle body side inner panel; and a fifth step for evacuating the jig unit downward from a vehicle body assembly obtained by connecting the vehicle body side inner panel and the vehicle body side outer panel to the roof panel.

25. A method for the assembly of the automotive vehicle in a vehicle body assembly line for mounting at least left-hand and right-hand vehicle body side panels to a roof panel, in which a side inner panel of each of the left-hand and right-hand vehicle body side panels is sub-assembled with a side outer panel thereof to form a side panel sub-assembly, a roof inner member of a roof panel is sub-assembled with a roof outer panel thereof to form a roof panel sub-assembly, the side panel subassembly and the roof panel sub-assembly are supplied separately to a connecting station in which the side panel sub-assembly is connected to the roof panel subassembly, and the side panel sub-assembly is connected to the roof panel sub-assembly in the connecting station, which comprises:

a first step for connecting the left-hand and right-hand vehicle body side inner panels to the roof panel by aligning the left-hand and right-hand vehicle body side inner panels and the roof inner member thereof supplied to the connecting station, fixing the left-hand and right-hand vehicle body side inner panels and the roof inner member thereof aligned, welding the left-hand and right-hand vehicle body side inner panels to the roof inner member thereof temporarily and thereafter supplementarily or permanently; and a second step for connecting the left-hand and right-hand vehicle body side outer panels to the roof outer panel by supplying the left-hand and right-hand side outer panels and the roof outer panel to the connecting station, aligning the left-hand and right-hand vehicle body side outer panels with the respective side inner panels, aligning the roof outer panel with the roof inner member thereof, and welding the left-hand and right-hand vehicle body side outer panels to the roof outer panel temporarily and then supplementarily or permanently.

26. A method as claimed in claim 25, wherein:
the vehicle body side outer panel is welded temporarily and then supplementarily or permanently to the roof outer panel in a welding station in the second step with the aid of a welding mechanism disposed so as to be located inside the vehicle body side panels and a welding robot disposed so as to be located outside the vehicle body side outer panel.

27. A method as claimed in claim 25, wherein:
the side outer panel is welded temporarily to the roof outer panel in the second step with the aid of the welding mechanism disposed so as to be located inside the vehicle body side panels; and
the side outer panel is welded supplementarily or permanently to the roof outer panel with the aid of the welding robot disposed so as to be located outside the vehicle body side outer panel.

28. A method for the assembly of an automotive vehicle body, comprising:
a first step for setting a vehicle body side panel, a front header, a rear header and a roof outer panel to a jig unit having a first holding mechanism for holding the vehicle body side panel from an inner position with respect to the vehicle body side panel after the vehicle body side panel has been aligned on the basis of an inner panel of the vehicle body side panel, a second holding mechanism for holding the front header and the rear header from an inner position with respect to the vehicle body side panel after the front header and the rear header have been aligned, and an eighth holding mechanism for holding the roof outer panel after having been aligned;

a second step for connecting the vehicle body side panel, the front header and the rear header to the roof outer panel, each being set to the jig unit, to form a vehicle body assembly; and a third step for evacuating the jig unit downward from an inner position with respect to the vehicle body assembly.

29. A jig unit for use with a method for the assembly of an automotive vehicle body, comprising:
a first holding mechanism disposed at a location inside vehicle body side panels for holding the vehicle body side panels aligned on the basis of side inner panels of the respective side panels; and
a second holding mechanism disposed located at a location inside a roof panel for holding the roof panel aligned on the basis of a roof inner member of the roof panel;
wherein the first holding mechanism is so arranged as to be movable between a holding position in which the vehicle body side panels are held and an evacuating position in which the first holding mechanism is evacuated from an inner position with respect to the side panels without causing interference with the vehicle body side panels; and
wherein the second holding mechanism is so arranged as to be movable between a holding position in which the roof panel is held and an evacuating position in which the second holding mechanism is evacuated from an inner position with respect to the roof panel without causing interference with the roof panel.

30. A jig unit as claimed in claim 29, wherein the second holding mechanism aligns the roof panel on the basis of the front header of the roof panel located at a front end of the roof panel and the rear header thereof located at a rear end thereof.

31. A Jig unit as claimed in claim 29, wherein the jig unit further contains a welding mechanism disposed so as to be located within the vehicle body side panels for welding the vehicle body side panels to the roof panel.

32. A jig unit as claimed in claim 29, wherein the jig unit further contains a third holding mechanism for aligning and holding a cowl dash panel assembly unit.

33. A jig unit as claimed in claim 29, wherein the jig unit further contains a fourth holding mechanism for aligning and holding a front vehicle body section.

34. A jig unit as claimed in claim 29, wherein the jig unit further contains a fifth holding mechanism for aligning and holding a rear floor assembly.

35. A jig unit as claimed in claim 29, wherein the jig unit further contains a sixth holding mechanism for aligning and holding a rear package tray assembly.

36. A jig unit as claimed in claim 29, wherein the jig unit further contains an adjusting mechanism disposed so as to be located inside a side door for adjusting the position of mounting the side door on the basis of an inner panel of the side door.

* * * * *